United States Patent
Habets et al.

(10) Patent No.: US 11,477,594 B2
(45) Date of Patent: Oct. 18, 2022

(54) CONCEPT FOR GENERATING AN ENHANCED SOUND-FIELD DESCRIPTION OR A MODIFIED SOUND FIELD DESCRIPTION USING A DEPTH-EXTENDED DIRAC TECHNIQUE OR OTHER TECHNIQUES

(71) Applicant: Fraunhofer-Gesellschaft zur Foerderung der angewandten Forschung e.V., Munich (DE)

(72) Inventors: Emanuel Habets, Erlangen (DE); Juergen Herre, Erlangen (DE); Axel Plinge, Erlangen (DE); Oliver Thiergart, Erlangen (DE); Fabian Kuech, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 3 days.

(21) Appl. No.: 16/740,290

(22) Filed: Jan. 10, 2020

(65) Prior Publication Data

US 2020/0154229 A1    May 14, 2020

Related U.S. Application Data

(63) Continuation of application No. PCT/EP2018/069147, filed on Jul. 13, 2018.

(30) Foreign Application Priority Data

Jul. 14, 2017 (EP) .................................. 17181481

(51) Int. Cl.
*H04S 7/00* (2006.01)
*H04S 3/00* (2006.01)

(52) U.S. Cl.
CPC .............. *H04S 7/303* (2013.01); *H04S 3/008* (2013.01); *H04S 2400/01* (2013.01);
(Continued)

(58) Field of Classification Search
None
See application file for complete search history.

(56) References Cited

U.S. PATENT DOCUMENTS

| 4,042,779 A | 8/1977 | Craven et al. |
| 9,196,257 B2 | 11/2015 | Schultz-amling et al. |

(Continued)

FOREIGN PATENT DOCUMENTS

| JP | H08107600 A | 4/1996 |
| JP | 2006074589 A | 3/2006 |

(Continued)

OTHER PUBLICATIONS

Altman, M, et al., "Immersive Audio for VR", Audio Engineering Society, Oct. 1, 2016, Conference on Audio for Virtual and Augmented Reality, 8 pp.

(Continued)

*Primary Examiner* — Paul W Huber
(74) *Attorney, Agent, or Firm* — Perkins Coie LLP; Michael A. Glenn

(57) ABSTRACT

An apparatus for generating an enhanced sound field description includes: a sound field generator for generating at least one sound field description indicating a sound field with respect to at least one reference location; and a meta data generator for generating meta data relating to spatial information of the sound field, wherein the at least one sound field description and the meta data constitute the enhanced sound field description. The meta data can be a depth map associating a distance information to a direction in a full band or a subband, i.e., a time frequency bin.

34 Claims, 17 Drawing Sheets

(52) U.S. Cl.
CPC ....... *H04S 2400/03* (2013.01); *H04S 2400/11* (2013.01); *H04S 2420/01* (2013.01)

(56) References Cited

U.S. PATENT DOCUMENTS

| | | |
|---|---|---|
| 9,769,588 B2 | 9/2017 | Shenoy et al. |
| 2007/0274528 A1 | 11/2007 | Nakamoto et al. |
| 2013/0016842 A1 | 1/2013 | Schultz-amling et al. |
| 2013/0142341 A1 | 6/2013 | Del Galdo et al. |
| 2013/0216070 A1 | 8/2013 | Keiler et al. |
| 2014/0023197 A1 | 1/2014 | Xiang et al. |
| 2014/0249827 A1 | 9/2014 | Sen et al. |
| 2014/0355766 A1 | 12/2014 | Morrell et al. |
| 2014/0358557 A1 | 12/2014 | Sen et al. |
| 2014/0358567 A1 | 12/2014 | Koppens et al. |
| 2015/0127354 A1 | 5/2015 | Peters et al. |
| 2015/0223002 A1 | 8/2015 | Mehta et al. |
| 2015/0296319 A1 | 10/2015 | Shenoy et al. |
| 2017/0125030 A1 | 5/2017 | Koppens et al. |
| 2017/0243589 A1 | 8/2017 | Krueger et al. |
| 2018/0206057 A1 | 7/2018 | Kim et al. |
| 2018/0359594 A1 | 12/2018 | Maeno et al. |

FOREIGN PATENT DOCUMENTS

| | | |
|---|---|---|
| JP | 2013514696 A | 4/2013 |
| JP | 2013545391 A | 12/2013 |
| JP | 2015502573 A | 1/2015 |
| JP | 2015509212 A | 3/2015 |
| KR | 20140000240 A | 1/2014 |
| KR | 20140097555 A | 8/2014 |
| RU | 2609102 C2 | 1/2017 |
| RU | 2015151021 A | 7/2017 |
| TW | 201237849 A | 9/2012 |
| TW | 201334580 A | 8/2013 |
| TW | 201614638 A | 4/2016 |
| WO | 9741711 A1 | 11/1997 |
| WO | 2012072804 A1 | 6/2012 |
| WO | 2013079568 A1 | 6/2013 |
| WO | 2013079663 A2 | 6/2013 |
| WO | 2015107926 A1 | 7/2015 |
| WO | 2016081655 A1 | 5/2016 |
| WO | 2017098949 A1 | 6/2017 |

OTHER PUBLICATIONS

Pihlajamäki, Tapani, et al., "" Synthesis of Complex Sound Scenes with Transformation of Recorded Spatial Sound in Virtual Reality, Journal of the Audio Engineering Society PAPERS vol. 63, No. 7/8, Jul./Aug. 2015, Aug. 2015.

Plinge, Axel, et al., "Six-Degrees-of-Freedom Binaural Audio Reproduction of First-Order Ambisonics with Distance Information", Aug. 22, 2018, Conference on Audio for Virtual and Augmented Reality, 10 pp.

Yang, Cheng, et al., "A 3D Audio Coding Technique Based on Extracting the Distance Parameter", Jul. 18, 2014, 2014 IEEE International Conference on Multimedia and Expo (ICME), 6 pp.

Anderson, Robert, et al., "Jump: Virtual Reality Video", ACM Transactions on Graphics, 35(6), p. 198, 2016, pp. 198-198:13.

Bates, Enda, et al., "Spatial Music, Virtual Reality, and 360 Media", Audio Eng. Soc. Int. Conf. on Audio for Virtual and Augmented Reality, Los Angeles, CA, U.S.A., 2016, 8 pp.

Boehm, Johannes, et al., "Scalable Decoding Mode for MPEG-H3D Audio HOA", 108. MPEG Meeting; Mar. 31, 2014-Apr. 4, 2014; Valencia; (Motion Picture Expert Group or ISO/IECJTC1/SC29/WG11), No. m33195, Mar. 26, 2014 (Mar. 26, 2014), XP030061647, p. 7, paragraph 2.4-p. 11, paragraph 2.5, pp. 7, 11.

Borss, Christian, "A polygon-based panning method for 3D loudspeaker setups", Audio Eng. Soc. Conv., pp. 343-352, Los Angeles, CA, USA, 2014, 10 pp.

Engelke, Ulrich, et al., "Psychophysiology-Based QoE Assessment: A Survey", IEEE Selected Topics in Signal Processing, 11(1), pp. 6-21, 2017, pp. 6-21.

Kowalczyk, Konrad, et al., "Parametric Spatial Sound Processing: A Flexible and Efficient Solution to Sound Scene Acquisition, Modification, and Reproduction", IEEE Signal Process. Mag., 32(2), pp. 31-42, 2015, pp. 31-42.

Kronlachner, Matthias, et al., "Spatial Transformations for the Enhancement of Ambisonics Recordings", 2nd International Conference on Spatial Audio, Erlangen, Germany, 2014, 5 pp.

Liitola, Toni, "Headphone sound externalization", Ph.D. thesis, Helsinki University of Technology. Department of Electrical and Communications Engineering Laboratory of Acoustics and Audio Signal Processing., 2006, 83 pp.

Pulkki, Ville, "Directional audio coding in spatial sound reproduction and stereo upmixing", Proc. of the 28th AES International Conference, 2006, 8 pp.

Pulkki, Ville, "Spatial Sound Reproduction with Directional Audio Coding", J. Audio Eng. Soc., 55(6), pp. 503-516, 2007, pp. 503-516.

Pulkki, Ville, "Virtual sound source positioning using vector base amplitude panning", J. Acoust. Soc. A m,, vol. 45, No. 6, pp. 456-466, Jun. 1997, pp. 456-466.

Rummukainen, Olli, et al., "Evaluating Binaural Reproduction Systems from Behavioral Patterns in a Virtual Reality—A Case Study with Impaired Binaural Cues and Tracking Latency", Audio Eng. Soc. Conv. 143, New York, NY, USA, 2017, 8 pp.

Rungta, Atul, et al., "Diffraction Kernels for Interactive Sound Propagation in Dynamic Environments", IEEE Trans. Visualization & Comp. Graphics, 24(4), pp. 1613-1622, 2018, pp. 1613-1622.

Schlecht, Sebastian J, et al., "Sign-Agnostic Matrix Design for Spatial Artificial Reverberation with Feedback Delay Networks", Proc. Audio Eng. Soc. Conf., p. 1-10—accepted, Tokyo, Japan, 2018, Aug. 6, 2018, 10 pp.

Schuijers, Erik, et al., "Low complexity parametric stereo coding", Proc. of the 116th A ES Convention, Berlin, Germany, 2004.

Taylor, Micah, et al., "Guided multi-view ray tracing for fast auralization", IEEE Trans. Visualization & Comp. Graphics, 18, pp. 1797-1810, 2012, pp. 1797-1810.

Thiergart, Oliver, et al., "An Acoustical Zoom based on Informed Spatial Filtering", Int. Workshop on Acoustic Signal Enhancement, pp. 109-113, 2014, pp. 109-113.

Thiergart, Oliver, et al., "Geometry-Based Spatial Sound Acquisition using Distributed Microphone Arrays", IEEE Trans. Audio, Speech, Language Process., 21(12), pp. 2583-2594, 2013, pp. 2583-2594.

Thiergart, Oliver, et al., "Three-Dimensional Sound Field Analysis with Directional Audio Coding Based on Signal Adaptive Parameter Estimators", Audio Eng. Soc. Conv. Spatial Audio: Sense the Sound of Space, 2010, 9 pp.

Tylka, J, et al., "Comparison of techniques for binaural navigation of higher order ambisonics sound fields", Proc. of the AES International Conference on Audio for Virtual and Augmented Reality, New York, Sep. 2016.

Tylka, Joseph G, et al., "Performance of Linear Extrapolation Methods of Virtual Sound Field Navigation", J. Audio Eng. Soc., vol. 68, No. 3, Mar. 2020, pp. 138-156.

Zhang, Wen, et al., "Surround by Sound: A Re-view of Spatial Audio Recording and Reproduction", Applied Sciences, 7(5), p. 532, 2017, 19 pp.

Ziegler, Matthias, et al., "Immersive Virtual Reality for Live-Action Video using Camera Arrays", IBC, Amsterdam, Netherlands, 2017, 8 pp.

"ITU-R BS.1534-3, Method for the subjective assessment of intermediate quality level of audio systems", International Telecommunication Union, 2015.

Blauert, Jens, "Spatial Hearing—Revised Edition: The Psychophysics of Human Sound Localization", The MIT Press, 1996, ISBN 0262024136, uploaded in 2 parts.

Bleidt, Robert L. et al., "Development of the MPEG-HTV Audio System for ATSC 3.011", IEEE Transactions on Broadcasting., vol. 63, No. 1, Mar. 2017 (Mar. 2017).

Boehm, Johannes et al., "Scalable Decoding Mode for MPEG-H3D Audio HOA", 108. MPEG Meeting; Mar. 31, 2014-Apr. 4, 2014; Valencia; (Motion Picture Expert Group or ISO/IECJTC1/SC29/WG11), No. m33195, Mar. 26, 2014 (Mar. 26, 2014), XP030061647, p. 7, paragraph 2.4-p. 11, paragraph 2.5, Mar. 26, 2014, pp. 7, 11.

(56) References Cited

OTHER PUBLICATIONS

Faller, Christof et al., "Binaural cue coding—Part II: schemes and applications", IEEE Trans on Speech and Audio Proc., vol. 11, No. 6, Nov. 2003.

Faller, Christof, "Parametric multichannel audio coding: Synthesis of coherence cues", IEEE Trans. Speech Audio Process., vol. 14, No. 1, Jan. 2006, Jan. 2006.

Gerzon, Michael A., "Periphony: With-height sound reproduction", J. Acoust. Soc. Am., vol. 21,110. 1, pp. 2-10, 1973, pp. 2-10.

Khaddour, Hasan et al., "A Novel Combined System of Direction Estimation and Sound Zooming of Multiple Speakers", Radioengineering, 24(2), 2015.

Kuttruff, Heinrich, "Room Acoustics", Taylor & Francis, 4 edition, 2000.

Merimaa, Juha, "Analysis, Synthesis and Perception of Spatial Sound: Binaural Localization Modeling and Multichannel Loudspeaker Reproduction", Ph.D. thesis, Helsinki University of Technology, 2006.

Pihlajamaki, Tapani et al., "Synthesis of Complex Sound Scenes with Transformation of Recorded Spatial Sound in Virtual Reality", JAES, AES, 60 East 42nd Street, Room 2520 New York 10165-2520, USA, vol. 63, No. 7/8, Aug. 18, 2015, pp. 542-551, XP040672137, Aug. 18, 2015, 15 pages.

Tsingos, Nicolas et al., "Perceptual Audio Rendering of Complex Virtual Environments", ACM Transactions on Graphics, 23(3), pp. 249-258, 2004, pp. 249-258.

Tylka, Joseph G. et al., "Soundfield Navigation using an Array of Higher-Order Ambisonics Microphones", Conference: 2016 AES International Conference on Audio for Virtual and Augmented Reality; Sep. 2016, AES, 60 East 42nd Street, Room 2520 N ew York, 10165-2520, USA, Sep. 21, 2016 (Sep. 21, 2016).

| 326 | 320a | 320b |
| --- | --- | --- |
| B-format or higher-order representation for time periods e.g. i and i + 1 | depth map per time period i | depth map for time period i + 1 |

Fig. 3b

| | B-format or higher-order representation for time period i | | | | B-format or higher-order representation for time period i+1 |
| --- | --- | --- | --- | --- | --- |
| | depth map $i^{(1)}$ | depth map $i^{(2)}$ | ... | depth map $i^{(Ni)}$ | |

Fig. 3c

| | B-format or higher-order representation for time period i | B-format or higher-order representation for time period i+1 | |
| --- | --- | --- | --- |
| | depth map for time period i | depth map for time period i+1 | |

Fig. 3d

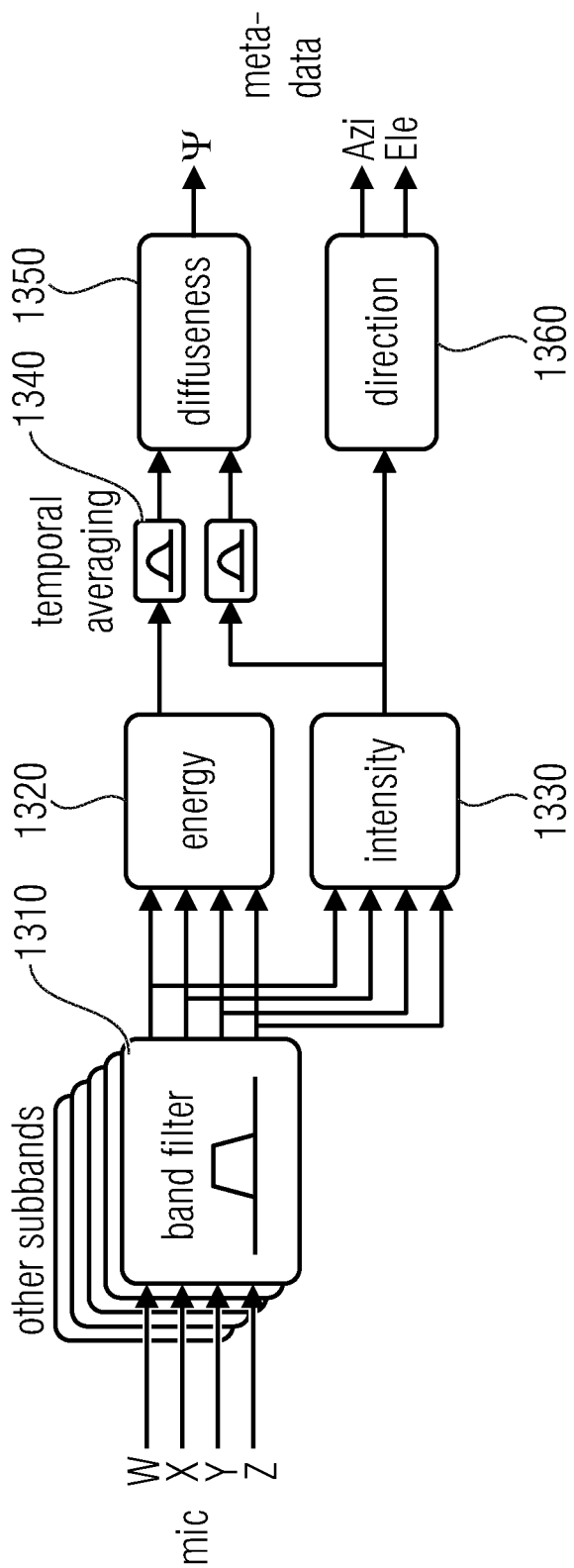
Fig. 13a DirAC analysis

DirAC synthesis

CONCEPT FOR GENERATING AN ENHANCED SOUND-FIELD DESCRIPTION OR A MODIFIED SOUND FIELD DESCRIPTION USING A DEPTH-EXTENDED DIRAC TECHNIQUE OR OTHER TECHNIQUES

CROSS-REFERENCES TO RELATED APPLICATIONS

This application is a continuation of copending International Application No. PCT/EP2018/069147, filed Jul. 13, 2018, which is incorporated herein by reference in its entirety, and additionally claims priority from European Application No. EP 17 181 481.7, filed Jul. 14, 2017, which is incorporated herein by reference in its entirety.

BACKGROUND OF THE INVENTION

The present invention is related to audio processing and, particularly, audio processing in relation to sound fields that are defined with respect to a reference location such as a microphone or a virtual microphone location.

Ambisonics signals comprise a truncated spherical harmonic decomposition of the sound field. Ambisonics comes in different flavors. There is 'traditional' Ambisonics [31] which today is known as 'First-Order Ambisonics' (FOA) and comprises four signals (i.e., one omnidirectional signal and up to three figure-of-eight directional signals). More recent Ambisonics variants are known as 'Higher-Order Ambisoncis' (HOA) and provide enhanced spatial resolution and larger listener sweet-spot area at the expense of carrying more signals. In general, a fully defined N-th order HOA representation consists of $(N+1)^2$ signals.

Related to the Ambisonics idea, the Directional Audio Coding (DirAC) representation has been conceived to represent a FOA or HOA sound scene in a more compact, parametric style. More specifically, the spatial sound scene is represented by one (or more) transmitted audio channels which represent a downmix of the acoustic scene and associated side information of the direction and diffuseness in each time-frequency (TF) bin. More information on DirAC can be found in [32, 33].

DirAC [32] can be used with different microphone systems and with arbitrary loudspeaker setups. The purpose of the DirAC system is to reproduce the spatial impression of an existing acoustical environment as precisely as possible using a multichannel/3D loudspeaker system. Within the chosen environment, responses (continuous sound or impulse responses) are measured with an omnidirectional microphone (W) and with a set of microphones that enables to measure the direction-of-arrival of sound and the diffuseness of sound. A common method is to apply three figure-of-eight microphones (X, Y, Z) aligned with the corresponding Cartesian coordinate axes [34]. A way to do this is to use a Sound field microphone, which directly yields all the desired responses. The W, X, Y, and Z signals can also be computed from a set of discrete omnidirectional microphones.

In DirAC, the sound signal is first divided into frequency channels according to frequency selectivity of the human auditory system. The sound direction and diffuseness is measured depending on time at each frequency channel. In transmission, one or more audio channels are sent, together with analyzed direction and diffuseness data. In synthesis, the audio which is applied to the loudspeakers can be for example the omnidirectional channel W, or the sound for each loudspeaker can be computed as a weighed sum of W, X, Y, and Z, which forms a signal which has a certain directional characteristics for each loudspeaker. Each audio channel is divided into frequency channels, which are then divided optionally to diffuse and to non-diffuse streams depending on analyzed diffuseness. Diffuse stream is reproduced with a technique, which produces diffuse perception of sound scene, e.g., the decorrelation techniques used in Binaural Cue Coding [35-37]. Non-diffuse sound is reproduced with a technique which aims to produce a point-like virtual source according to the direction data (e.g. VBAP [38]).

Three techniques for navigation in 6DoF with a limited degree-of-freedom are proposed in [39]. Given a single Ambisonics signal, a single Ambisonics signal is computed using: 1) simulating HOA playback and listener movement within a virtual loudspeaker array, 2) computing and translating along plane-waves, and 3) re-expanding the sound field about the listener.

Furthermore, reference is made to the DirAC technology as described, for example, in the publication "Directional Audio Coding—Perception-Based Reproduction of Spatial Sound", V. Pulkki et al, International Workshop on the Principles and Applications of Spatial Hearing, Nov. 11-13, 2009, Zao, Miyagi, Japan. This reference describes directional audio coding as an example for a reference location related sound-field processing particularly as a perceptually motivated technique for spatial audio processing.

Reproduction of sound scenes has often been focusing on loudspeaker setups, as this was the typical reproduction in private, e.g., living room, and professional context, i.e., cinemas. Here, the relation of the scene to the reproduction geometry is static as it accompanies a two-dimensional image that forces the listener to look in the front direction. Subsequently, the spatial relation of the sound and visual objects is defined and fixed at production time.

In virtual reality (VR), the immersion is explicitly achieved by allowing the user to move freely in the scene. Therefore, the user's movement needs to be tracked and the visual and auditory reproduction needs to be adjusted to the user's position. Typically, the user is wearing a head-mounted display (HMD) and headphones. For an immersive experience with headphones, the audio has to be binauralized. Binauralization is a simulation of how the human head, ears, and upper torso change the sound of a source depending on its direction and distance. This is achieved by convolution of the signals with head-related transfer functions (HRTFs) for their relative direction [1, 2]. Binauralization also makes the sound appear to be coming from the scene rather than from inside the head [3]. A common scenario that has already been addressed successfully is 360 video reproduction [4, 5]. Here, the user is either wearing an HMD or holding a tablet or phone in his hands. By moving her/his head or the device, the user can look around in any direction. This is a three-degrees-of-freedom (3DoF) scenario, as the user has three movement degrees (pitch, yaw, roll). Visually, this is realized by projecting the video on a sphere around the user. Audio is often recorded with a spatial microphone [6], e.g., first-order Ambisonics (FOA), close to the video camera. In the Ambisonics domain, the user's head rotation is adapted in a straightforward manner [7]. The audio is then for example rendered to virtual loudspeakers placed around the user. These virtual loudspeaker signals are then binauralized.

Modern VR applications allow for six-degrees-of-freedom (6DoF). Additionally to the head rotation, the user can move around resulting in translation of her/his position in three spatial dimensions. The 6DoF reproduction is limited by the overall size of the walking area. In many cases, this area is rather small, e.g., a conventional living room. 6DoF is commonly encountered in VR games. Here, the whole scene is synthetic with computer-generated imagery (CGI). The audio is often generated using object-based rendering where each audio object is rendered with distance-dependent gain and relative direction from the user based on the tracking data. Realism can be enhanced by artificial reverberation and diffraction [8, 9, 10].

Regarding recorded content, there are some distinct challenges for convincing audio-visual 6DoF reproduction. An early example of spatial sound manipulation in the spatial translation domain is that of 'acoustic zoom' techniques [11, 12]. Here, the listener position is virtually moved into the recorded visual scene, similar to zooming into an image. The user chooses one direction or image portion and can then listen to this from a translated point. This entails that all the direction of arrivals (DoAs) are changing relative to the original, non-zoomed reproduction.

Methods for 6DoF reproduction of recorded content have been using spatially distributed recording positions have been proposed. For video, arrays of cameras can be employed to generate light-field rendering [13]. For audio, a similar setup employs distributed micro-phone arrays or Ambisonics microphones. It has been shown that it is possible to generate the signal of a 'virtual microphone' placed at an arbitrary position from such recordings [14].

In order to realize such spatial sound modifications in a technically convenient way, parametric sound processing or coding techniques can be employed (cf. [15] for an overview). Directional audio coding (DirAC) [16] is a popular method to transform the recording into a representation that consists of an audio spectrum and parametric side information on the sound direction and diffuseness. It is used for acoustic zoom [11] and virtual microphone [14] applications.

The method proposed here enables 6DoF reproduction from the recording of a single FOA microphone. Recordings from a single spatial position have been used for 3DoF reproduction or acoustic zoom. But, to the inventors' knowledge, no method for interactive, fully 6DoF reproduction from such data has been proposed so far. One realizes the 6DoF reproduction by integrating information about the distance of the sound sources in the recording. This distance information is incorporated into the parametric representation of DirAC, such that the changed perspective of the listener is correctly mapped. For evaluation with a listening test, the multiple stimuli with hidden reference and anchor (MUSHRA) paradigm [17] is adapted for VR. By using CGI and synthetically generated sound, one can create an object-based reference for comparison. A virtual FOA recording takes place at the tracked position of the user, rendering the 6DoF-adjusted signals. Additionally to the proposed method, the reproduction without distance information and translation were presented as conditions in the listening test.

None of the Ambisonics sound field representations (be it as regular FOA or HOA Ambisonics or as DirAC-style parametric sound field representation) provide sufficient information to allow a translational shift of the listener's position as it is needed for 6DoF applications since neither object distance nor absolute object positions in the sound scene are determined in these formats. It should be noted that the shift in the listener's position can be translated into an equivalent shift of the sound scene in the opposite direction.

A typical problem when moving in 6DoF is illustrated in FIG. 1b. Let us assume that the sound scene is described at Position A using Ambisonics. In this case sounds from Source A and Source B arrive from the same direction, i.e., they have the same direction-of-arrival (DOA). In case one moves to Position B the DOA of Source A and Source B are different. Using a standard Ambisonics description of the sound field, i.e., without additional information, it is not possible to compute the Ambisonics signals at Position B given the Ambisonics signals at Position A.

SUMMARY

According to an embodiment, an apparatus for generating an enhanced sound field description may have: a sound field generator for generating at least one sound field description indicating a sound field with respect to at least one reference location; and a meta data generator for generating meta data relating to spatial information of the sound field, wherein the at least one sound field description and the meta data constitute the enhanced sound field description.

According to another embodiment, an apparatus for generating a modified sound field description from a sound field description and meta data relating to spatial information of the sound field description may have: a sound field calculator for calculating the modified sound field using the spatial information, the sound field description and a translation information indicating a translation from a reference location to a different reference location.

According to another embodiment, a method of generating an enhanced sound field description may have the steps of: generating at least one sound field description indicating a sound field with respect to at least one reference location; and generating meta data relating to spatial information of the sound field, wherein the at least one sound field description and the meta data constitute the enhanced sound field description.

According to another embodiment, a method of generating a modified sound field description from a sound field description and meta data relating to spatial information of the sound field description may have the step of: calculating the modified sound field using the spatial information, the sound field description and a translation information indicating a translation from a reference location to a different reference location.

Another embodiment may have a non-transitory digital storage medium having a computer program stored thereon to perform the method of generating an enhanced sound field description, the method having the steps of: generating at least one sound field description indicating a sound field with respect to at least one reference location; and generating meta data relating to spatial information of the sound field, wherein the at least one sound field description and the meta data constitute the enhanced sound field description, when said computer program is run by a computer.

Another embodiment may have a non-transitory digital storage medium having a computer program stored thereon to perform the method of generating a modified sound field description from a sound field description and meta data relating to spatial information of the sound field description, the method having the step of: calculating the modified sound field using the spatial information, the sound field description and a translation information indicating a translation from a reference location to a different reference location, when said computer program is run by a computer.

According to another embodiment, an enhanced sound field description may have: at least one sound field description indicating a sound field with respect to at least one reference location and meta data relating to spatial information of the sound field.

The present invention is based on the finding that typical sound field descriptions that are related to a reference location need additional information so that these sound field descriptions can be processed so that a modified sound field description that is not related to the original reference location but to another reference location can be calculated. To this end, meta data relating to spatial information of this sound field is generated and the meta data together with the sound field description corresponds to the enhanced sound field description that can, for example, be transmitted or stored. In order to generate a modified sound field description from the sound field description and the meta data and, specifically, the meta data relating to spatial information of the sound field description, the modified sound field is calculated using this spatial information, the sound field description and a translation information indicating a translation from a reference location to a different reference location. Thus, the enhanced sound field description consisting of a sound field description and meta data relating to spatial information of this sound field underlying the sound field description is processed to obtain a modified sound field description that is related to a different reference location defined by additional translation information that can, for example, be provided or used at a decoder-side.

However, the present invention is not only related to an encoder/decoder scenario, but can also be applied in an application where both, the generation of the enhanced sound field description and the generation of the modified sound field description take place on basically one and the same location. The modified sound field description may, for example, be a description of the modified sound field itself or actually the modified sound field in channel signals, binaural signals or, once again, a reference location-related sound field that, however, is now related to the new or different reference location rather than the original reference location. Such an application would, for example, be in a virtual reality scenario where a sound field description together with a meta data exists and where a listener moves out from the reference location to which the sound field is given and moves to a different reference location and where, then, the sound field for the listener moving around in the virtual area is calculated to correspond to the sound field but now at the different reference location where the user has moved to.

In an advantageous embodiment, the sound field generator generates a DirAC description of the sound field having one or more downmix signals and individual direction data and optionally diffuseness data for different time-frequency bins. In this context, the meta data generator is configured to generate additional individual distance or depth information for the different time-frequency bins as the meta data. Particularly, and in an advantageous embodiment, the meta data relating to spatial information would be a depth map associating a certain distance to a certain position information such as a direction of arrival information.

In embodiments, the direction of arrival is given by only elevation or only azimuth or both angles and the depth map would then associate, to each position information or direction of arrival information (DoA information) a certain distance information such as a distance in meters or so or a relative distance or a quantized absolute or relative distance or any other distance information, from which, finally, a distance with respect to the reference location, to which the sound field is related to can be derived.

Subsequently, other advantageous implementations are outlined.

Ambisonics has become one of the most commonly used formats for 3D audio in the context of virtual, augmented, and mixed reality applications. A wide variety of audio acquisition and production tools have been developed that generate an output signal in Ambisonics format. To present Ambisonics coded content in interactive virtual reality (VR) applications, the Ambisonics format is converted to a binaural signal or channels for reproduction. In the aforementioned applications, the listener is usually able to interactively change his/her orientation in the presented scene to the extent that he/she can rotate his/her head in the sound scene enabling three-degrees-of-freedom (3DoF, i.e., pitch, yaw, and role) and still experience an appropriate sound quality. This is implemented by rotating the sound scene before rendering according to the head orientation, which can be implemented with low computational complexity and is an advantage of the Ambisonics representation. In emerging applications, such as VR, it is however desired to allow the user free movement in the sound scene rather than only changes of orientation (so-called 'six-degrees-of-freedom' or 6DoF). As a consequence, signal processing is needed to change the perspective of the sound scene (i.e. to virtually move within the sound scene along the x-, y-, or z-axes). However, a major disadvantage of Ambisonics is that the format describes the sound field from a single perspective in the sound scene. Specifically, it does not contain information about the actual location of sound sources in the sound scene which would allow to shift the sound scene ('translation') as it is needed for 6DoF. This invention description provides several extensions of Ambisonics to overcome this problem and facilitate also the translation, and hence enable true 6DoF.

First-order Ambisonics (FOA) recordings can be processed and reproduced over headphones. They can be rotated to account for the listeners head orientation. However, virtual reality (VR) systems allow the listener to move in six-degrees-of-freedom (6DoF), i.e., three rotational plus three transitional degrees of freedom. Here, the apparent angles and distances of the sound sources depend on the listener's position. A technique to facilitate 6DoF is described. In particular, a FOA recording is described using a parametric model, which is modified based on the listener's position and information about the distances to the sources. The method is evaluated by a listening test, comparing different binaural renderings of a synthetic sound scene in which the listener can move freely.

In further advantageous embodiments, the enhanced sound field description is output by an output interface for generating an output signal for transmission or storage, where the output signal comprises, for a time frame, one or more audio signals derived from the sound field and the spatial information for the time frame. Particularly, the sound field generator is in further embodiments adaptive to derive direction data from the sound field, the direction data referring to a direction of arrival of sound for a time period or a frequency bin and the meta data generator is configured to derive the spatial information as data items associating a distance information to the direction data.

Particularly, in such an embodiment, an output interface is configured to generate the output signals so that the data items for the time frame are linked to the direction data for the different frequency bins.

In a further embodiment, the sound field generator is also configured to generate a diffuseness information for a plurality of frequency bins of a time frame of the sound field, wherein the meta data generator is configured to only generate a distance information for a frequency bin being different from a predetermined value, or being different from infinity or to generate a distance value for the frequency bin at all, when the diffuseness value is lower than a predetermined or adaptive threshold. Thus, for time/frequency bins that have a high diffuseness, any distance value is not generated at all or a predetermined distance value is generated that is interpreted by a decoder in a certain way. Thus, it is made sure that for time/frequency bins having a high diffuseness, any distance-related rendering is not performed, since a high diffuseness indicates that, for such a time/frequency bin, the sound does not come from a certain localized source but comes from any direction and, therefore, is the same irrespective of whether the sound field is perceived at the original reference location or the different or new reference location.

With respect to the sound field calculator, advantageous embodiments comprise a translation interface for providing the translation information or rotation information indicating a rotation of an intended listener to the modified sound field, a meta data supplier for supplying the meta data to the sound field calculator and a sound field supplier for supplying the sound field description to the sound field calculator and, additionally, an output interface for outputting the modified sound field comprising the modified sound field description and modified meta data, the modified meta data being derived from the meta data using the translation information, or the output interface outputs a plurality of loudspeaker channels, each loudspeaker channel being related a predefined loudspeaker position, or the output interface outputs a binaural representation of the modified sound field.

In an embodiment, the sound field description comprises a plurality of sound field components. The plurality of sound field components comprise an omnidirectional component and at least one directional component. Such a sound field description is, for example, a first-order Ambisonics sound field description having an omnidirectional component and three directional components X, Y, Z or such a sound field is a higher-order Ambisonics description comprising the omnidirectional component, the three directional components with respect to the X, Y, and Z directions and, additionally, further directional components that relate to other directions than the X, Y, Z directions.

In an embodiment, the apparatus comprises an analyzer for analyzing the sound field components to derive, for different time or frequency bins, direction of arrival information. The apparatus additionally has a translation transformer for calculating modified DoA information per frequency or time bin using the DoA information and the meta data, where the meta data relate to a depth map associating a distance to a DoA information for a time or frequency bin.

Furthermore, the sound field calculator has a distance compensator for calculating the modified sound field using a distance compensation information depending from the distance provided from the depth map for the frequency or time bin, and from a new distance associated with the time or frequency bin, the new distance being related to the modified DoA information.

In an embodiment, the sound field calculator calculates a first vector pointing from the reference location to a sound source obtained by an analysis of the sound field. Furthermore, the sound field calculator calculates a second vector pointing from the different reference location to the sound source and this calculation is done using the first vector and the translation information, where the translation information defines a translation vector from the reference location to the different reference location. And, then, a distance from the different reference location to the sound source is calculated using the second vector.

Furthermore, the sound field calculator is configured to receive, in addition to the translation information, a rotation information indicating a rotation of the listener's head in one of the three rotation directions given by pitch, yaw and roll. The sound field calculator is then configured to perform the rotation transformation to rotate a modified direction of arrival data for a sound field using the rotation information, where the modified direction of arrival data is derived from a direction of arrival data obtained by a sound analysis of the sound field description and the translation information.

In an embodiment, the sound field calculator is configured to determine source signals from the sound field description and directions of the source signals related to the reference location by a sound analysis.

Then, new directions of the sound sources are calculated that are related to the different reference location and this is done using the meta data, and then distance information of the sound sources related to the different reference location is calculated and, then, the modified sound field is synthesized using the distance information and the new directions of the sound sources.

In an embodiment, a sound field synthesis is performed by panning the sound source signals to a direction given by the new direction information in relation to a replay setup, and a scaling of the sound source signals is done using the distance information before performing the panning operation or subsequent to performing the panning operation.

In a further embodiment, a diffuse part of the sound source signal is added to a direct part of the sound source signal, the direct part being modified by the distance information before being added to the diffuse part.

Particularly, it is advantageous to perform the sound source synthesis in a spectral representation where the new direction information is calculated for each frequency bin, where the distance information is calculated for each frequency bin, and where a direct synthesis for each frequency bin using the audio signal for the frequency bin is performed using an audio signal for the frequency bin, a panning gain for the frequency bin derived from the new direction information and a scaling factor for the frequency bin derived from the distance information for the frequency bin is performed.

Furthermore, a diffuse synthesis is performed using a diffuse audio signal derived from the audio signal from the frequency bin and using a diffuseness parameter derived by the signal analysis for the frequency bin and, then, the direct signal and the diffuse signal are combined to obtain a synthesized audio signal for the time or frequency bin and, then, a frequency-time conversion is performed using audio signals for other time/frequency bins to obtain a time domain synthesized audio signal as the modified sound field.

Therefore, in general, the sound field calculator is configured to synthesize, for each sound source, a sound field related to the different reference location by, for example, processing, for each source, a source signal using the new direction for the source signal to obtain a sound field description of the source signal related to the different/new reference location. Furthermore, the source signal is modified before processing the source signal or subsequent to processing the source signal using the direction information. And, finally, the sound field descriptions for the sources are added together to obtain the modified sound field related to the different reference location.

In a further embodiment, the sound field calculator performs, alternatively to a DirAC analysis or any other sound source analysis, a source separation algorithm. The source separation algorithm results, in the end, in sound source signals, for example, in the time domain or in the frequency domain. A diffuse signal is then calculated by subtracting the sound source signals from the original sound field so that the original sound field is decomposed into a diffuse signal and several sound source signals, where each sound source signal has associated therewith a certain direction.

BRIEF DESCRIPTION OF THE DRAWINGS

Embodiments of the present invention will be detailed subsequently referring to the appended drawings, in which:

FIG. 3b illustrates a further illustration of an enhanced sound field comprising audio data and meta data relating to spatial information such as a depth map;

FIG. 3c illustrates an other format for associating the meta data to the sound field description FIG. 3d illustrates a further format for associating the meta data to the sound field description

FIG. 13a illustrates a conventional DirAC analysis implementation; and

DETAILED DESCRIPTION OF THE INVENTION

To enable 6DoF applications for the mentioned Ambisonics/DirAC representations, these representations need to be extended in a way that provides the missing information for translational processing. It is noted that this extension could, e.g., 1) add the distance or positions of the objects to the existing scene representation, and/or 2) add information that would facilitate the process of separating the individual objects.

It is furthermore an objective of embodiments to preserve/re-use the structure of the existing (non-parametric or parametric) Ambisonics systems to provide backward compatibility with these representations/systems in the sense that the extended representations can be converted into the existing non-extended ones (e.g. for rendering), and allow re-use of existing software and hardware implementations when working with the extended representation.

In the following, several approaches are described, namely one limited (but very simple) approach and three different extended Ambisonics formats to enable 6DoF.

As described in the state-of-the-art section, traditional DirAC carries a parametric side information which characterizes direction and diffuseness for each TF (Time Frequency) bin. An extension of the existing DirAC format additionally provides a depth information for each or several but not all TF bins. Similarly to the direction information, the relevance of the depth information depends on the actual diffuseness. High diffuseness means that both direction and depth are not relevant (and could be in fact omitted for very high diffuseness values).

It should be noted that the depth-extended DirAC does not provide a full 6DoF solution since it is able to only carry the direction and depth information for one object per TF bin.

It should be noted that the depth information could be estimated either from the audio signals or from video signals (e.g., a depth-map commonly used in stereoscopic (3D) imaging/video or lightfield technology) or can be added manually or automatically specifically when the sound field is generated by a sound synthesis with localized sound sources.

Figure 1A:
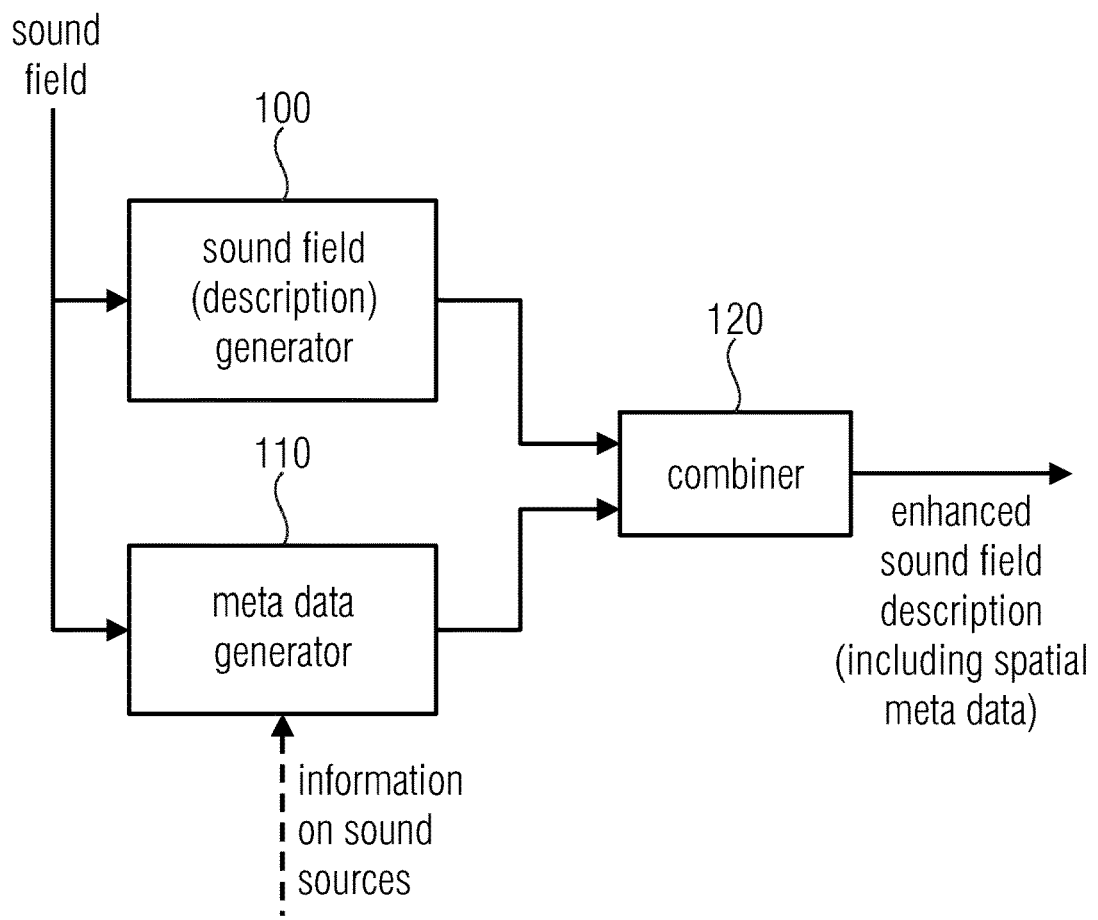
FIG. 1a is an advantageous embodiment of an apparatus for generating an enhanced sound field description.

FIG. 1a illustrates an apparatus for generating an enhanced sound field description comprising a sound field (description) generator 100 for generating at least one sound field description indicating a sound field with respect to at least one reference location. Furthermore, the apparatus comprises a meta data generator 110 for generating meta data relating to spatial information of the sound field. The meta data receives, as an input, the sound field or alternatively or additionally, separate information on sound sources.

Both, the output of the sound field description generator 100 and the meta data generator 110 constitute the enhanced sound field description. In an embodiment, both, the output of the sound field description generator 100 and the meta data generator 110 can be combined within a combiner 120 or output interface 120 to obtain the enhanced sound field description that includes the spatial meta data or spatial information of the sound field as generated by the meta data generator 110.

Figure 1B:
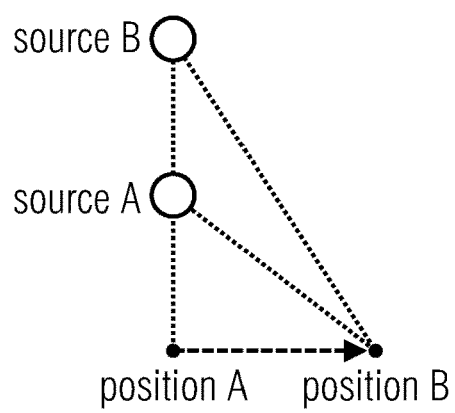
FIG. 1b is an illustration explaining an exemplary problem underlying the present invention.

FIG. 1b illustrates the situation that is addressed by the present invention. The position A, for example, is the at least one reference location and a sound field is generated by source A and source B and a certain actual or, for example, virtual microphone being located at the position A detects the sound from source A and source B. The sound is a superposition of the sound coming from the emitting sound sources. This represents the sound field description as generated by the sound field description generator.

Additionally, the meta data generator would, by certain implementations derive a spatial information with respect to source A and another spatial information with respect to source B such as the distances of these sources to the reference position such as position A.

Naturally, the reference position could, alternatively, be position B. Then, the actual or virtual microphone would be placed at position B and the sound field description would be a sound field, for example, represented by the first-order Ambisonics components or higher-order Ambisonics components or any other sound components having the potential to describe a sound field with respect to at least one reference location, i.e., position B.

The meta data generator might, then, generate, as the information on the sound sources, the distance of sound source A to position B or the distance of source B to position B. Alternative information on sound sources could, of course, be the absolute or relative position with respect to a reference position. The reference position could be the origin of a general coordinate system or could be located in a defined relation to the origin of a general coordinate system.

Other meta data could be the absolute position of one sound source and the relative position of another sound source with respect to the first sound source and so on.

Figure 2:
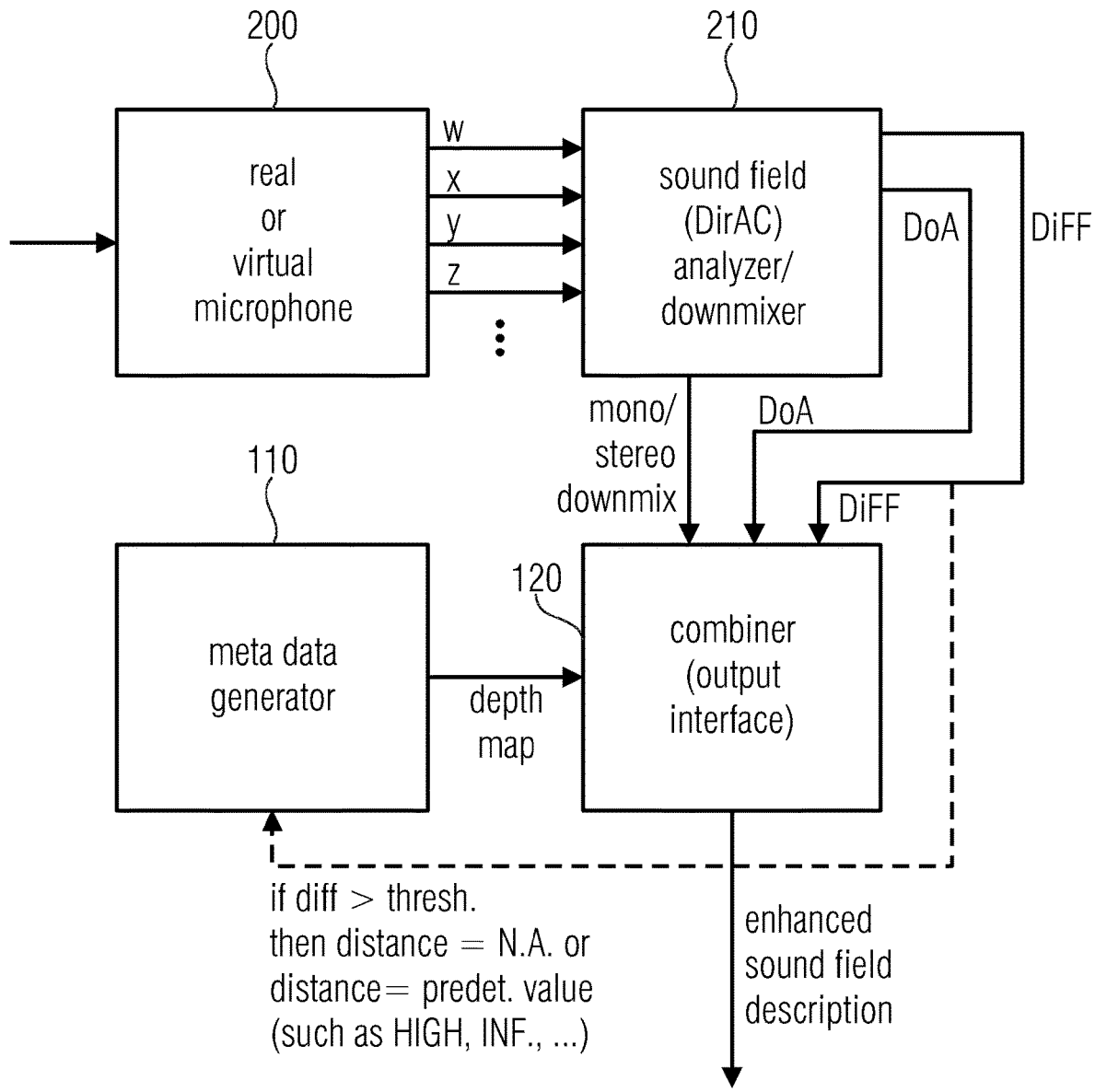
FIG. 2 is an advantageous implementation of the apparatus for generating an enhanced sound field description.

FIG. 2 illustrates an advantageous implementation of the sound field description generator. The sound field description generator can, for example, consist of a real or virtual microphone 200 that generates, from an input sound field, sound field components such as a first-order Ambisonics representation illustrated in FIG. 2 as an omnidirectional component w, and the three direction components x, y, z.

Based on this sound field description, a sound field analyzer 210 that can, additionally, comprise a downmixer, would generate a parametric sound field description consisting of a mono or stereo downmix and additional parameters such as direction of arrival DoA parameters, for example, per time frames or frequency bins or, generally, time/frequency bins and, additionally, diffuseness information for the same or a smaller number of time/frequency bins.

Furthermore, the meta data generator 110 would, for example, be implemented as a depth map generator that generates a depth map that associates, to each direction of arrival or DoA information, a certain distance either in absolute or relative terms. Furthermore, the meta data generator 110 is, in an advantageous embodiment, also controlled by the diffuseness parameter for a time/frequency bin. In this implementation, the meta data generator 110 would be implemented to not generate any distance information for a time and/or frequency bin that has a diffuseness value being higher than a certain predetermined or adaptive threshold. This is due to the fact that, when a certain time or frequency bin shows a high diffuseness, then one can draw the conclusion that in this time or frequency bin, there does not exist any localized sound source, but there does only exist diffuse sound coming from all directions. Thus, for such a time of frequency bin, the meta data generator would generate, within the depth map, not a value at all as indicated by "N.A" in FIG. 2, or alternatively, the meta data generator would introduce a distance value having a predetermined value such as a code for high, infinity or any other value that would be acknowledged by a decoder as such a value indicating to a non-localized sound source for a time/frequency bin.

The depth map and the sound field description generated by the sound field analyzer 210 corresponding to a mono/stereo downmix representation together with spatial parameters that are related to the reference location are then combined within the combiner 120 to generate the enhanced sound field description.

Figure 3A:
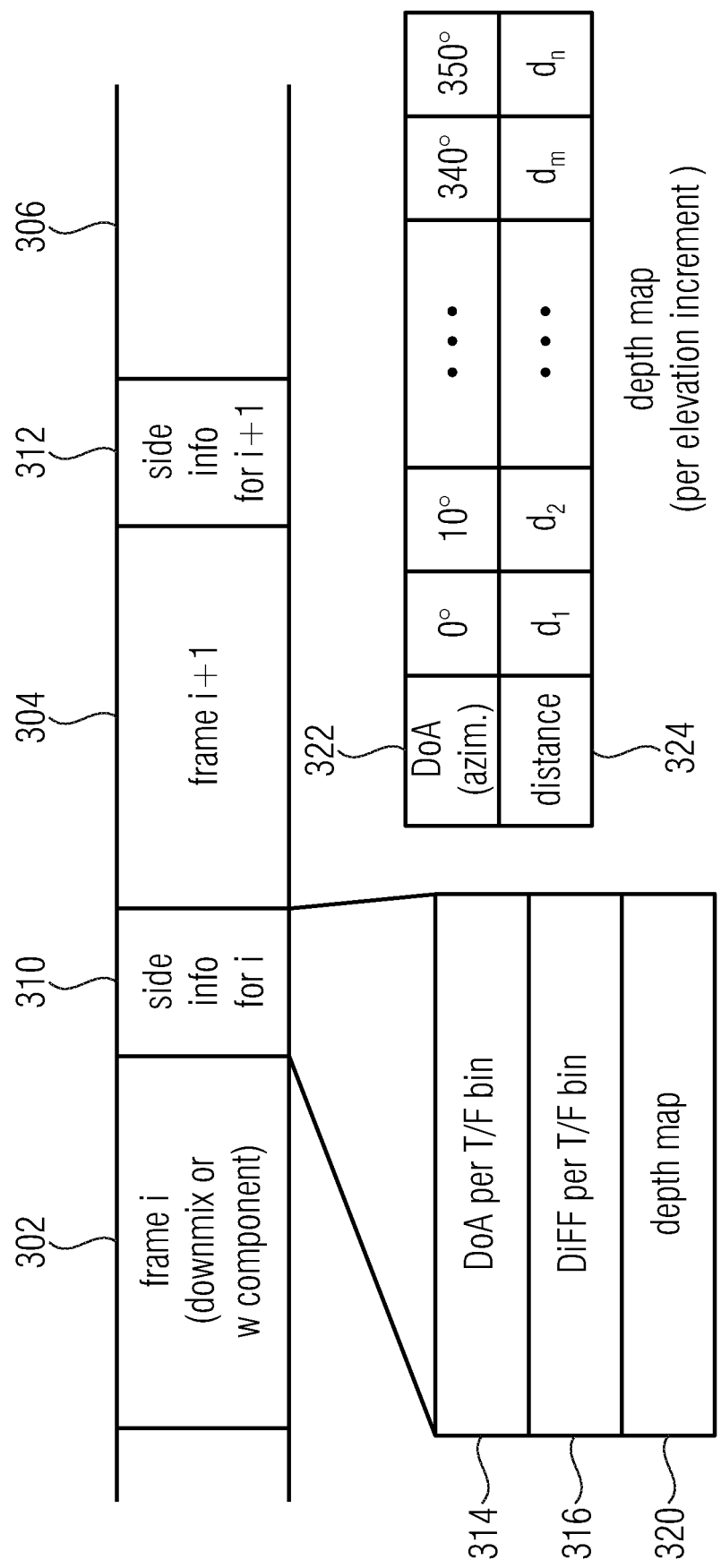
FIG. 3a illustrates the enhanced sound field description comprising audio data, and side information for audio data.

FIG. 3a illustrates an example of a bitstream or general data stream comprising the enhance sound field description. The data stream would comprise time frames i, i+1 and so on as indicated by reference numbers 302, 304, 306 and related side information for the corresponding time frame as illustrated by blocks 310, 312. In the embodiment, the side information would include a direction of arrival information per time/frequency bin as indicated at 314, and, optionally, a diffuseness value per time/frequency bin as illustrated by item 316 and, additionally, for the frame i, a depth map 320. An exemplary depth map is also illustrated in FIG. 3a indicated by item 322 and 324. Item 322 illustrates different DoA information extending, for example, between 0° and 350° in azimuth direction with an exemplary increment of 10°. Additionally, item 324 illustrates a corresponding distance value associated with a certain DoA value. Such a depth map would be generated for each elevation increment so that, in the end, a depth map would associate, to each combination of azimuth angle and elevation angle, i.e., to each DoA information, a certain distance value.

Naturally, other probably more efficient ways for generating and transmitting the depth map can be performed where, typically, for each DoA value occurring for a frequency bin in a certain time frame that has a diffuseness value being lower than a certain threshold value, a distance would be present.

FIG. 3b illustrates another implementation where the sound field analyzer 210 in FIG. 2 does not actually generate a downmix, but generates a full representation in the B-format an A-format or any other such as higher-order representation for a certain time period. Then, a depth map 320a and another depth map 320b would be associated with the audio signal representation indicated at 326 in FIG. 3b. When, for example, the time period, to which the B-format or higher-order representation is associated with comprises several individual time periods, and when a change of the location of the sources is occurring within these time periods, then a depth map 320a for a first time period i and another depth map for time period i+1 indicated at item 320b would be associated to the audio signal representation 326. As outlined, the audio signal representation in FIG. 3b is different from the representation in FIG. 3a, since FIG. 3a only has a representation of the downmix or w component and, additionally, a representation in different time frames, where FIG. 3b has another audio signal representation with a full directional component representation either with three or more directional components and not separated into individual time frames but associated with depth maps for smaller time increments compared to the time periods, for which item 326 is given. Although illustrated in FIG. 3b as a sequential format, it is to be noted that a parallel format or a mix between parallel and serial or a certain other format such as an MP4 container format can be used.

FIGS. 3c and 3d illustrate other formats for associating the meta data to the sound field description in the form of a B format or a Higher-Order representation. The index i, i+1 stands for time and the index (1), (2), (Ni) stands for direction.

Figure 4A:
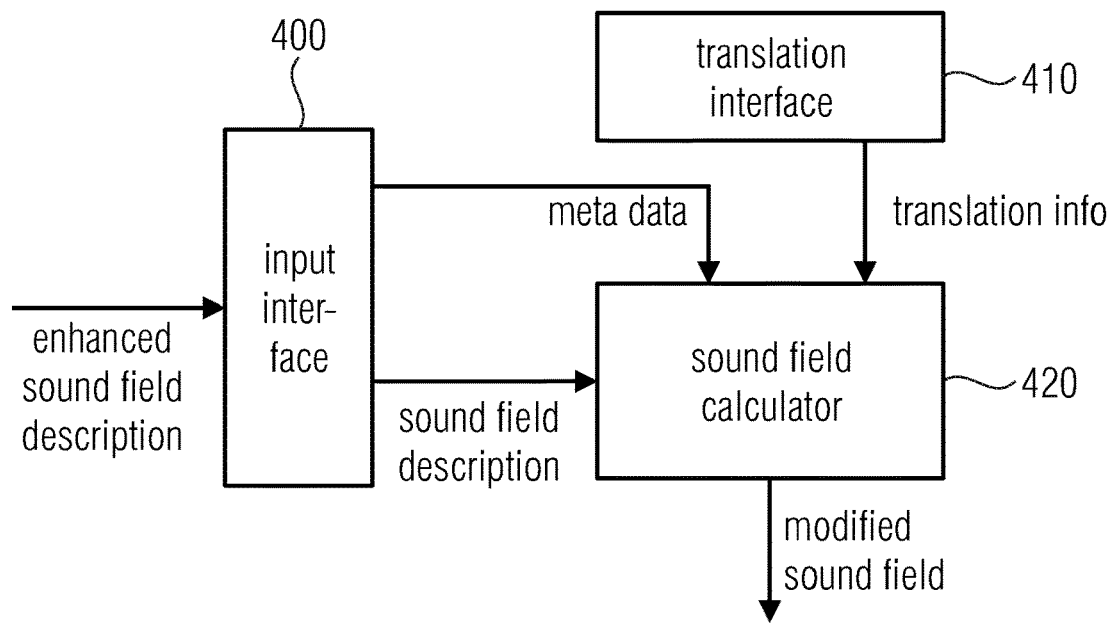
FIG. 4a illustrates an implementation of an apparatus of generating a modified sound field description.

FIG. 4a illustrates an advantageous implementation of an apparatus for generating a modified sound field description from a sound field description and meta data relating to spatial information of the sound field description. Particularly, the apparatus comprises a sound field calculator 420 that generates the modified sound field using meta data, the sound field description and translation information indicating a translation from a reference location to a different reference location.

When, for example, the sound field is given with respect to position A in FIG. 1b, then the different reference location could be position B and the translation information would, for example, be a vector indicating the translation of position A to position B. The sound field calculator 420 would then calculate the modified sound field as if it would be perceived by a listener being located at position B, and for this calculation, the sound field calculator has the sound field description related to position A and the translation information and, additionally, the meta data relating the spatial position of source A and source B.

In an embodiment, the sound field calculator 420 is connected to an input interface 400 for receiving the enhanced sound field description as, for example, discussed with respect to FIG. 1a or 2 and the input interface 400 then separates the sound field description on the one hand, i.e., what has been generated by block 100 of FIG. 1a or block 210 of FIG. 2. Furthermore, the input interface 400 separates the meta data from the enhanced sound field description, i.e., item 310, 312 of FIG. 3a or 320a, 320b of FIG. 3b.

Furthermore, a translation interface 410 obtains the translation information and/or additional or separate rotation information from a listener. An implementation of the translation interface 410 can be a head-tracking unit that not only tracks the rotation of a head in a virtual reality environment, but also a translation of the head from one position, i.e., position A in FIG. 1b to another position, i.e., position B in FIG. 1b.

Figure 4B:
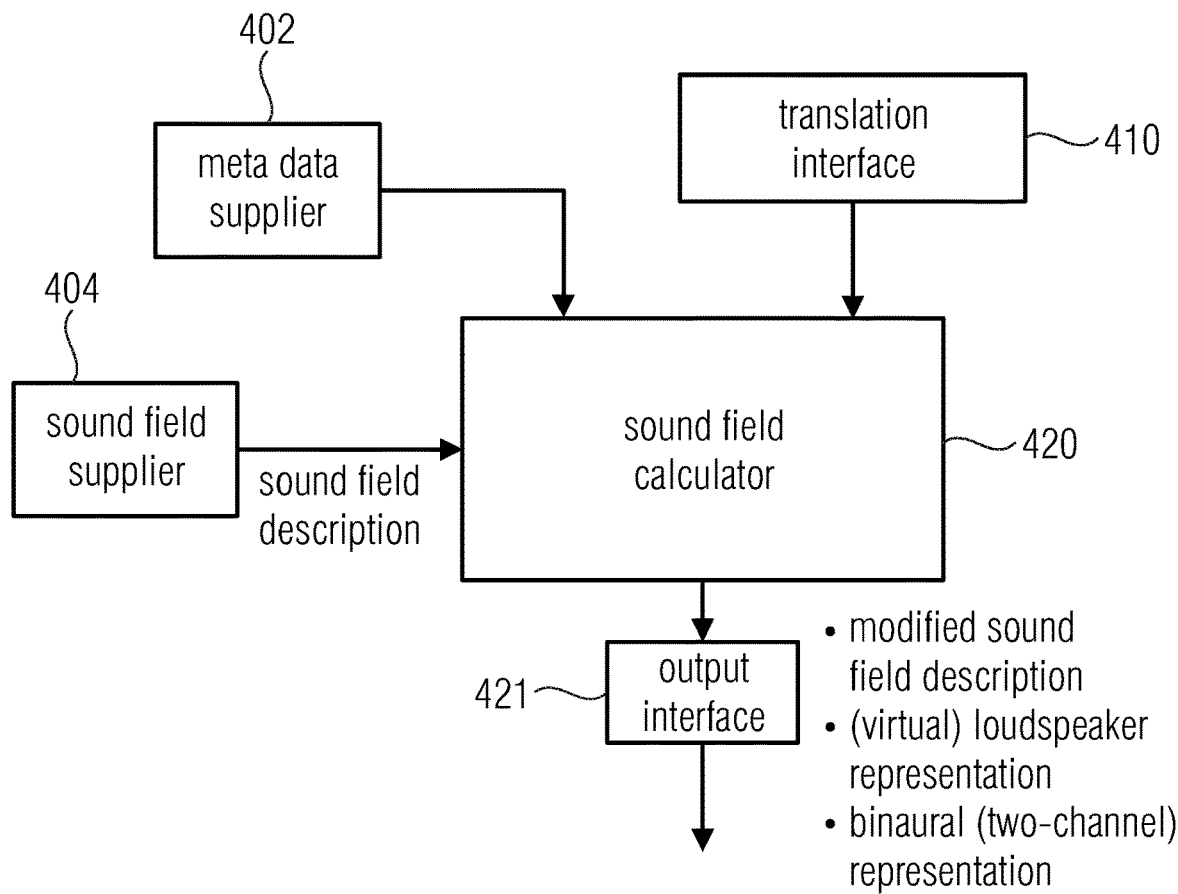
FIG. 4b illustrates a further implementation of an apparatus for generating a modified sound field description.

FIG. 4b illustrates another implementation similar to FIG. 1a, but not related to an encoder/decoder scenario, but related to a general scenario where the meta data supply indicated by a meta data supplier 402, the sound field supply indicated by a sound field supplier 404 are done without a certain input interface separating an encoded or enhanced sound field description, but are all done, for example, in an actual scenario existing, for example, in a virtual reality application. However, the present invention is not limited to virtual reality applications, but can also be implemented in any other applications, where the spatial audio processing of sound fields that are related to a reference location is useful in order to transform a sound field related to a first reference location to another sound field related to a different second reference location.

The sound field calculator 420 then generates the modified sound field description or, alternatively, generates a (virtual) loudspeaker representation or generates a binaural representation such as a two-channel representation for a headphone reproduction. Thus, the sound field calculator 420 can generate, as the modified sound field, a modified sound field description, being basically the same as the original sound field description, but now with respect to a new reference position. In an alternative embodiment, a virtual or actual loudspeaker representation can be generated for a predetermined loudspeaker setup such as 5.1 scheme or a loudspeaker setup having more loudspeakers and, particularly, having a three-dimensional arrangement of loudspeakers rather than only a two-dimensional arrangement, i.e., a loudspeaker arrangement having loudspeakers being elevated with respect to the user position. Other applications that are specifically useful for virtual reality applications are applications for binaural reproduction, i.e., for a headphone that can be applied to the virtual reality user's head.

Figure 4C:
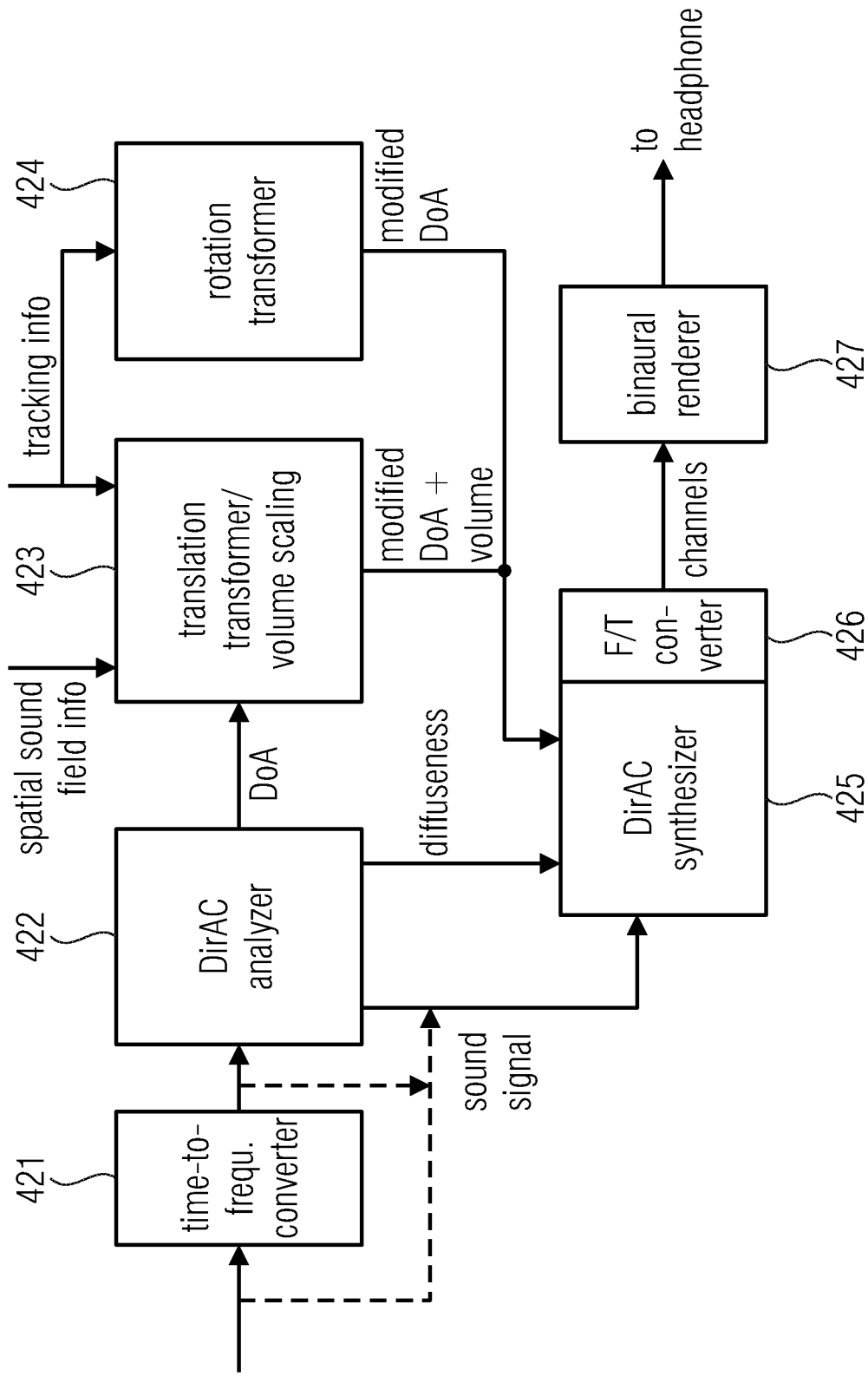
FIG. 4c illustrates a further embodiment of an apparatus for generating a modified sound field description.

FIG. 4c illustrates an advantageous implementation of the present invention in the context of the DirAC analysis/synthesis. To this end, a sound field description actually picked-up by real microphones or originally generated by virtual microphones or synthesized earlier and now used in a virtual reality application or in any other application is input into a time-to-frequency converter 421.

Then, a DirAC analyzer 422 is configured to generating, for each time/frequency bin, a direction of arrival data item and a diffuseness data item.

Using the spatial sound field information such as given by a depth map, for example, the block 423 performing a translation transformation and, optionally, a volume scaling information, a new direction of arrival value is calculated. Advantageously, a rotation transformation 424 is performed as well and, of course, tracking information relating to translation information on the one hand and rotation information on the other hand is used in blocks 423 to 424 to generate new direction of arrival data as input into a DirAC synthesizer block 425. Then, additionally, a scaling information depending on the new distance between the sound source and the new reference position indicated by the tracking information, is also generated in block 423 and is used within the DirAC synthesizer 425 to finally perform a DirAC synthesis for each time/frequency bin. Then, in block 426, a frequency/time conversion is performed, advantageously, with respect to a certain predetermined virtual loudspeaker setup and, then, in block 427, a binaural rendering for a binaural headphone representation is performed.

In a further embodiment, the DirAC synthesizer directly provides the binaural signals in the TF domain.

Depending on the implementation of the DirAC analyzer, and, of course, depending on the implementation of the DirAC synthesizer 425, the original sound field at the input into block 421 or at the output of block 421 can be forwarded to the DirAC synthesizer 425 or, alternatively, a downmix signal generated by the DirAC analyzer 422 is forwarded to the DirAC synthesizer.

Figure 6:
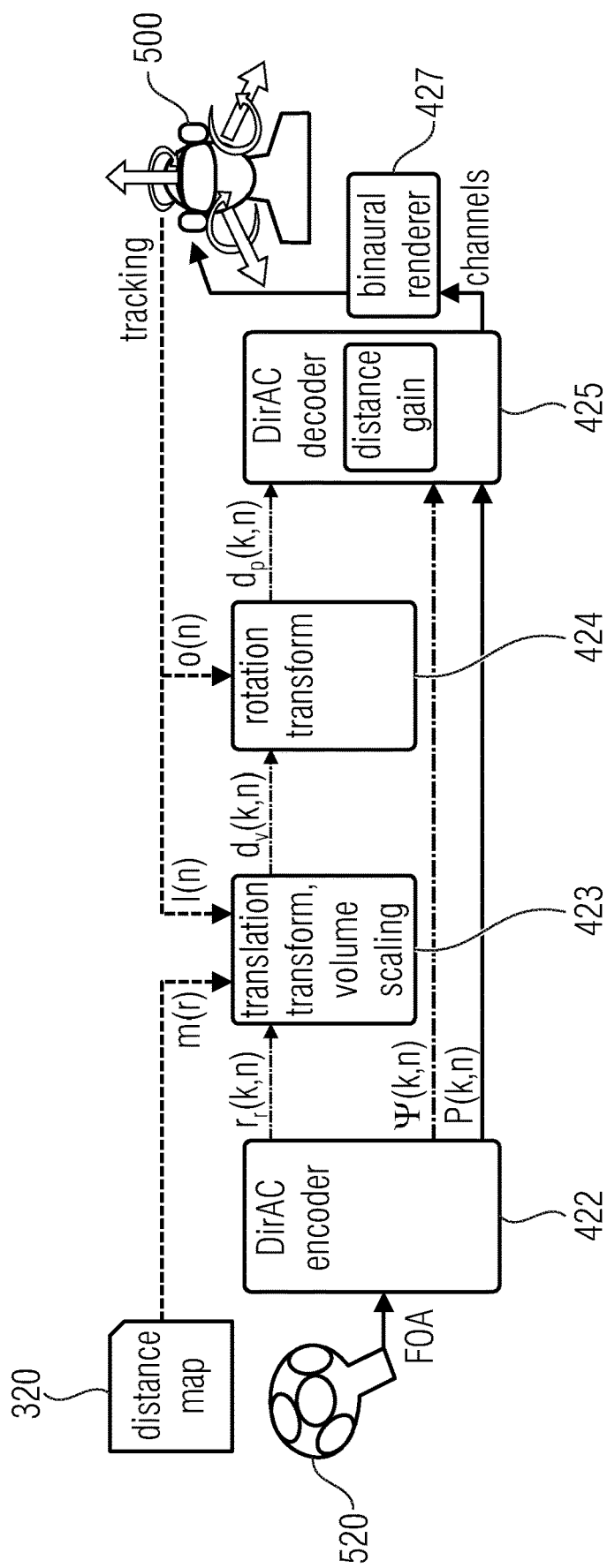
FIG. 6 illustrates an advantageous embodiment of a sixth DoF reproduction comprising an apparatus for generating an enhanced sound field description and an apparatus for generating a modified sound field description.

Exemplarily, the subsequently described FIG. 6 illustrates a situation, where a DirAC synthesizer only operates on a downmix component such as the omnidirectional or pressure component, while, in a further alternative embodiment illustrated with respect to FIG. 13b, the DirAC synthesizer operates on the whole sound field data, i.e., the full component representation having, in this embodiment in FIG. 13b, a field description with an omnidirectional component w and three directional components x, y, z.

Figure 4D:
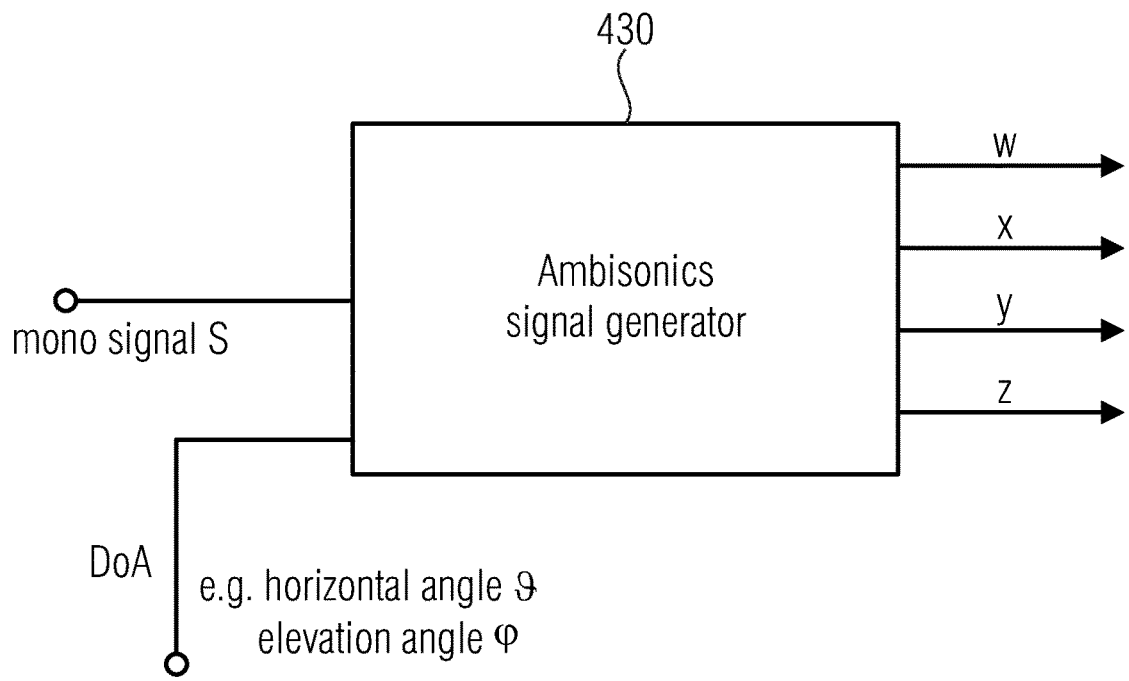
FIG. 4d illustrates an exemplary device for generating a sound field description from an audio signal such as a mono-signal and directional of arrival data.

FIG. 4d illustrates another implementation for performing a synthesis different from the DirAC synthesizer. When, for example, a sound field analyzer generates, for each source signal, a separate mono signal S and an original direction of arrival and when, depending on the translation information, a new direction of arrival is calculated, then the Ambisonics signal generator 430 of FIG. 4d, for example, would be used to generate a sound field description for the sound source signal, i.e., the mono signal S but for the new direction of arrival (DoA) data consisting of a horizontal angle θ or an elevation angle θ and an azimuth angle φ. Then, a procedure performed by the sound field calculator 420 of FIG. 4b would be to generate, for example, a first-order Ambisonics sound field representation for each sound source with the new direction of arrival and, then, a further modification per sound source could be performed using a scaling factor depending on the distance of the sound field to the new reference location and, then, all the sound fields from the individual sources could superposed to each other to finally obtain the modified sound field, once again, in, for example, an Ambisonics representation related to a certain new reference location.

When one interprets that each time/frequency bin processed by the DirAC analyzer 422 represents a certain (bandwidth limited) sound source, then the Ambisonics signal generator 430 could be used, instead of the DirAC synthesizer 425, to generate, for each time/frequency bin, a full Ambisonics representation using the downmix signal or pressure signal or omnidirectional component for this time/frequency bin as the "mono signal S" of FIG. 4d. Then, an individual frequency-time conversion in frequency-time converter 426 for each of the W, X, Y, Z component would then result in a sound field description different from what is illustrated in FIG. 4c.

Further embodiments are outlined in the following. The goal is to obtain a virtual binaural signal at the listener's position given a signal at the original recording position and information about the distances of sound sources from the recording position. The physical sources are assumed to be separable by their angle towards the recording position.

The scene is recorded from the point of view (PoV) of the microphone, which position is used as the origin of the reference coordinate system. The scene has to be reproduced from the PoV of the listener, who is tracked in 6DoF, cf. FIG. 5. A single sound source is shown here for illustration, the relation holds for each time-frequency bin.

Figure 5:
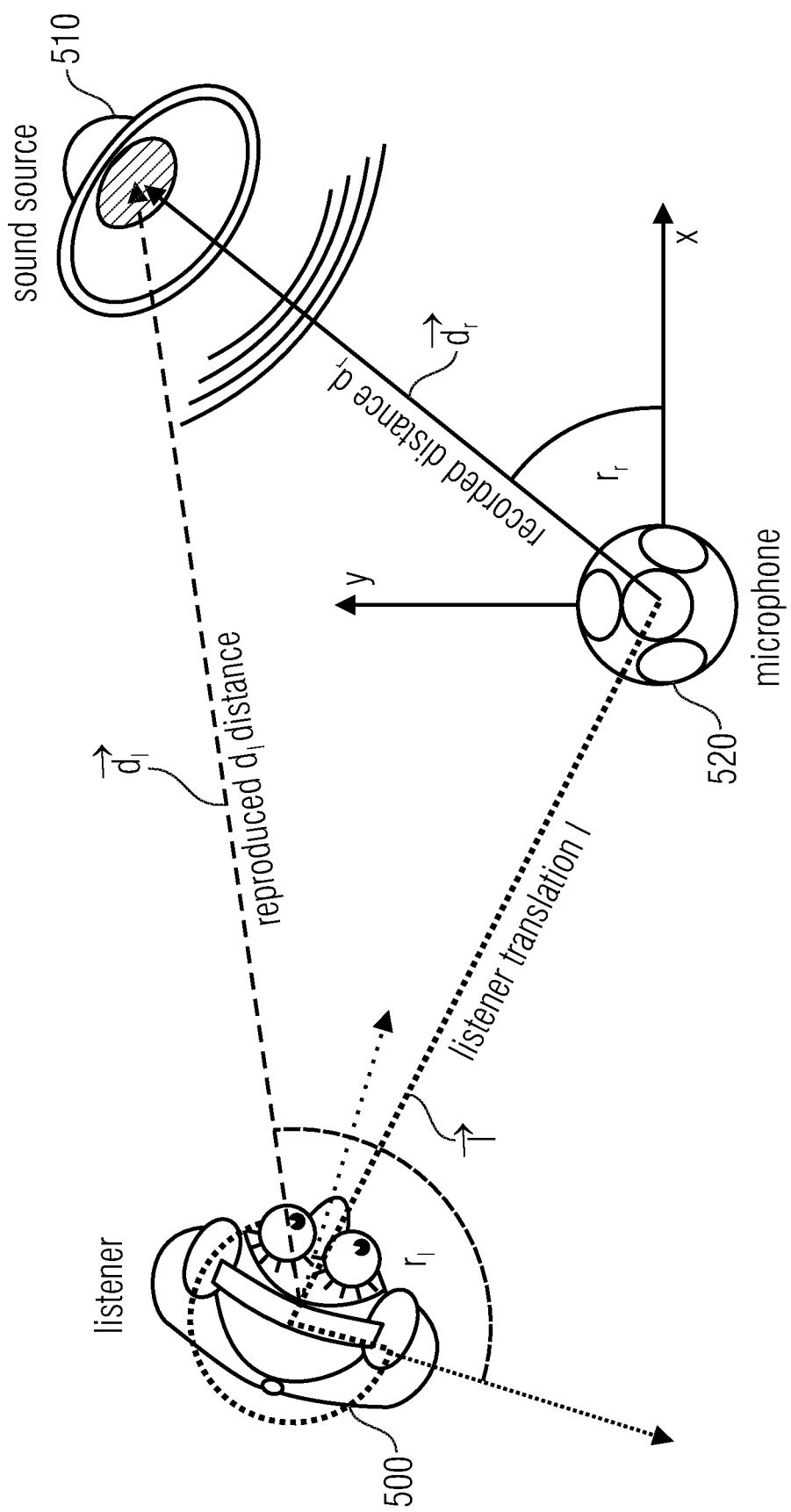
FIG. 5 illustrates the six DoF reproduction of spatial audio.

FIG. 5 illustrates the 6DoF reproduction of spatial audio. A sound source is recorded by a microphone with the DoA $r_r$ in the distance $d_r$ relative to the microphones position and orientation (black line and arc). It has to be reproduced relative to the moving listener with the DoA $r_l$ and distance $d_l$ (dashed). This has to consider the listeners translation/and rotation o (dotted).

The sound source at the coordinates $d_r \in \mathbb{R}^3$ is recorded from the direction of arrival (DoA) expressed by the unit vector $r_r = d_r/\|d_r\|$. This DoA can be estimated from analysis of the recording. It is coming from the distance $d_r = \|d_r\|$. It is assumed that this information can be estimated automatically, e.g., using a time-of-flight camera, to obtain distance information in the form of a depth map m(r) mapping each direction r from the recording position the distance of the closest sound source in meters.

The listener is tracked in 6DoF. At a given time, he is at a position $l \in \mathbb{R}^3$ relative to the microphone and has a rotation $o \in \mathbb{R}^3$ relative to the microphones' coordinates system. The recording position is chosen as the origin of the coordinate system to simplify the notation.

Thus the sound has to be reproduced with a different distance $d_l$, leading to a changed volume, and a different DoA $r_l$ that is the result of both translation and subsequent rotation.

A method for obtaining a virtual signal from the listeners perspective by dedicated transformations based on a parametric representation, as explained in the following section, is outlined.

The proposed method is based on the basic DirAC approach for parametric spatial sound encoding cf. [16]. It is assumed that there is one dominant direct source per time-frequency instance of the analyzed spectrum and these can be treated independently. The recording is transformed into a time-frequency representation using short time Fourier transform (STFT). The time frame index is denoted with n and the frequency index with k. The transformed recording is then analyzed, estimating directions $r_r$ (k,n) and diffuseness $\psi$(k,n) for each time-frequency bin of the complex spectrum P(k,n). In the synthesis, the signal is divided into a direct and diffuse part. Here, loudspeaker signals are computed by panning the direct part depending on the speaker positions and adding the diffuse part.

The method for transforming an FOA signal according to the listeners perspective in 6DoF can be divided into five steps, cf. FIG. 6.

FIG. 6 illustrates a method of 6DoF reproduction. The recorded FOA signal in B-Format is processed by a DirAC encoder that computes direction and diffuseness values for each time-frequency bin of the complex spectrum. The direction vector is then transformed by the listener's tracked position and according to the distance information given in a distance map. The resulting direction vector is then rotated according to the head rotation. Finally, signals for 8+4 virtual loudspeaker channels are synthesized in the DirAC decoder. These are then binauralized.

In the embodiment, the input signal is analyzed in the DirAC encoder 422, the distance information is added from the distance map m(r), then the listeners tracked translation and rotation are applied in the novel transforms 423 and 424. The DirAC decoder 425 synthesizes signals for 8+4 virtual loudspeakers, which are in turn binauralized 427 for headphone playback. Note that as the rotation of the sound scene after the translation is an independent operation, it could be alternatively applied in the binaural renderer. The only parameter transformed for 6DoF is the direction vector. By the model definition, the diffuse part is assumed to be isotropic and homogeneous and thus is kept unchanged.

The input to the DirAC encoder is an FOA sound signal in B-format representation. It consists of four channels, i.e., the omnidirectional sound pressure and the three first-order spatial gradients, which under certain assumptions are proportional to the particle velocity. This signal is encoded in a parametric way, cf. [18]. The parameters are derived from the complex sound pressure P (k,n), which is the transformed omnidirectional signal and the complex particle velocity vector U(k,n)=[$U_X$ (k,n), $U_Y$ (k,n), $U_Z$ (k,n)] corresponding to the transformed gradient signals.

The DirAC representation consists of the signal P(k,n), the diffuseness $\psi$(k,n) and direction r (k,n) of the sound wave at each time-frequency bin. To derive the latter, first, the active sound intensity vector $I_a$ (k,n) is computed as the real part (denoted by Re(•)) of the product of pressure vector with the complex conjugate (denoted by (•)*) of the velocity vector [18]:

$$I_a(k,n) = \tfrac{1}{2} \mathrm{Re}(P(k,n)U^*(k,n)). \tag{1}$$

The diffuseness is estimated from the coefficient of Variation of this vector [18].

$$\psi(k,n) = \sqrt{1 - \frac{\|E\{I_a(k,n)\}\|}{E\{\|I_a(k,n)\|\}}} \tag{2}$$

where E denotes the expectation operator along time frames, implemented as moving average.

Since it is intended to manipulate the sound using a direction-based distance map, the variance of the direction estimates should be low. As the frames are typically short, this is not always the case. Therefore, in an optional embodiment, a moving average is applied to obtain a smoothed direction estimate $\bar{I}_a$(k, n). The DoA of the direct part of the signal is then computed as unit length vector in the opposite direction:

$$r_r(k, n) = \frac{\bar{I}_a(k, n)}{\|\bar{I}_a(k, n)\|} \quad (3)$$

As the direction is encoded as a three-dimensional vector of unit length for each time-frequency bin, it is straightforward to integrate the distance information. The direction vectors are multiplied with their corresponding map entry such that the vector length represents the distance of the corresponding sound source $d_r(k, n)$:

$$d_r(k, n) = r_r(k, n)d_r(k, n) \quad (4)$$
$$= r_r(k, n)m(r_r(k, n))$$

where $d_r(k, n)$ is a vector pointing from the recording position of the microphone to the sound source active at time n and frequency bin k.

The listener position is given by the tracking system for the current processing frame as l(n). With the vector representation of source positions, one can subtract the tracking position vector l(n) to yield the new, translated direction vector $d_l(k, n)$ with the length $d_l(k,n)=\|d_l(k, n)\|$, cf. FIG. 10. The distances from the listener's PoV to the sound sources are derived, and the DoAs are adapted in a single step:

$$d_l(k,n)=d_r(k,n)-l(n) \quad (5)$$

An important aspect of realistic reproduction is the distance attenuation. The attenuation is assumed to be a function of the distance between sound source and listener [19]. The length of the direction vectors is to encode the attenuation or amplification for reproduction. The distance to the recording position is encoded in $d_r(k, n)$ according to the distance map, and the distance to be reproduced encoded in $d_l(k, n)$. If one normalizes the vectors to unit length and then multiply by the ratio of old and new distance, one sees that the needed length is given by dividing $d_l(k, n)$ by the length of the original vector:

$$d_V(k, n) = \frac{d_l(k, n)}{\|d_l(k, n)\|} \frac{\|d_l(k, n)\|}{\|d_r(k, n)\|} = \frac{d_l(k, n)}{\|d_r(k, n)\|} \quad (6)$$

The changes for the listener's orientation are applied in the following step. The orientation given by the tracking can be written as vector composed of the pitch, yaw, and roll $o(n)=[o_X(n), o_Z(n), o_Y(n)]^T$ relative to the recording position as the origin. The source direction is rotated according to the listener orientation, which is implemented using 2D rotation matrices:

$$d_p(k,n)=R_Y(o_Y(n))R_Z(o_Z(n))R_X(o_X(n))d_v(k,n) \quad (7)$$

The resulting DoA for the listener is then given by the vector normalized to unit length:

$$r_p(k, n) = \frac{d_p(k, n)}{\|d_p(k, n)\|} \quad (8)$$

The transformed direction vector, the diffuseness, and the complex spectrum are used to synthesize signals for a uniformly distributed 8+4 virtual loudspeaker setup. Eight virtual speakers are located in 45° azimuth steps on the listener plane (elevation 0°), and four in a 90° cross formation above at 45° elevation. The synthesis is split into a direct and diffuse part for each loudspeaker channel $1 \le i \le I$, where I=12 is the number of loudspeakers [16]:

$$Y_i(k,n)=Y_{i,S}(k,n)+Y_{i,D}(k,n) \quad (9)$$

For the direct part, edge fading amplitude panning (EFAP) panning is applied to reproduce the sound from the right direction given the virtual loudspeaker geometry [20]. Given the DoA vector $r_p(k, n)$, this provides a panning gain $G_i(r)$ for each virtual loudspeaker channel i. The distance-dependent gain for each DoA is derived from the resulting length of the direction vector, $d_p(k, n)$. The direct synthesis for channel i becomes:

$$Y_{i,S}(k,n)=\sqrt{1-\psi(k,n)}P(k,n)G_i(r_p(k,n))(\|d_p(k,n)\|)^{-\gamma} \quad (10)$$

where the exponent γ is a tuning factor that is typically set to about 1 [19]. Note that with γ=0 the distance-dependent gain is turned off.

The pressure P(k, n) is used to generate/decorrelated signals $\tilde{P}_i(k, n)$. These decorrelated signals are added to the individual loudspeaker channels as the diffuse component. This follows the standard method [16]:

$$Y_{i,D}(k, n) = \sqrt{\psi(k, n)} \frac{1}{\sqrt{I}} \tilde{P}_i(k, n) \quad (11)$$

The diffuse and direct part of each channel are added together, and the signals are transformed back into the time domain by an inverse STFT. These channel time domain signals are convolved with HRTFs for the left and right ear depending on the loudspeaker position to create binauralized signals.

For the evaluation, a single scene in a virtual living room is reproduced. Different rendering conditions are used to reproduce three simultaneously active sound sources. A novel MUSHRA-VR technique was used to access the quality with the help of test subjects.

Figure 7:
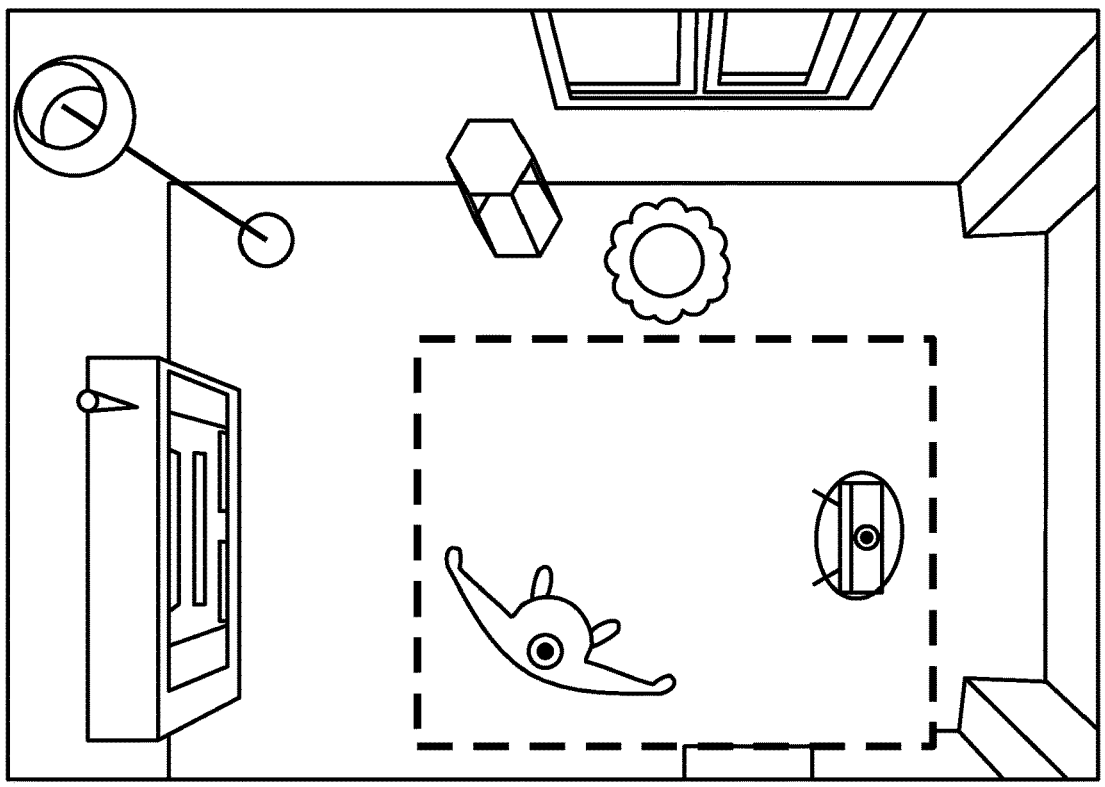
FIG. 7 illustrates a virtual reality scene representation.

The virtual environment in the experiment is an indoor room with three sound sources at different distances from the recording position. At about 50 cm there is a human speaker, at 1 m a radio and at 2 m an open window, cf. FIG. 7. FIG. 7 illustrates a VR scene, where the sound is coming from the person, the radio and the open window, each source marked with a circle. The user can walk in the area marked by the dashed rectangle around the person towards the window.

The visual rendering is done using Unity and an HTC VIVE. The audio processing is implemented with the help of virtual studio technology (VST) plugins and Max/MSP. The tracking data and conditions are exchanged via open sound control (OSC) messages. The walking area is about 2×2 m.

While there are established standards for evaluation of static audio reproduction, these are usually not directly applicable for VR. Especially for 6DoF, novel approaches for evaluation of the audio quality have to be developed as the experience is more complicated than in audio-only evaluation, and the presented content depends on the unique motion path of each listener. Novel methods such as wayfinding in VR [21] or physiological responses to immersive experiences [22] are actively researched, but traditional well-tested methods can also be adapted to a VR environment to support development work done today.

MUSHRA is a widely adopted audio quality evaluation method applied to a wide range of use cases from speech quality evaluation to multichannel spatial audio setups [17]. It allows side-by-side comparison of a reference with multiple renderings of the same audio content and provides an absolute quality scale through the use of a hidden reference and anchor test items. In this test, the MUSHRA methodology is adopted into a VR setting, and thus some departures from the recommended implementation are needed. Specifically, the version implemented here does not allow looping of the audio content, and the anchor item is the 3DoF rendering.

The different conditions are randomly assigned to the test conditions in each run. Each participant is asked to evaluate the audio quality of each condition and give a score on a scale of 0 to 100. They know that one of the conditions is, in fact, identical to the reference and as such to be scored with 100 points. The worst 'anchor' condition is to be scored 20 (bad) or lower; all other conditions should be scored in between.

Figure 8:
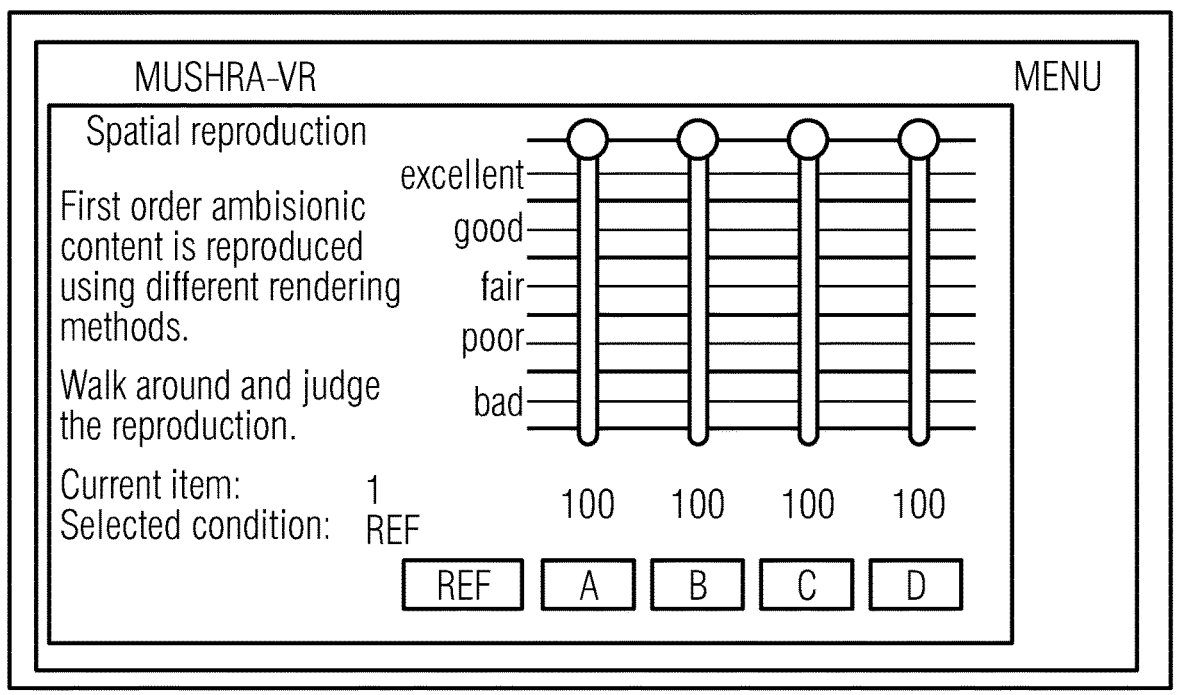
FIG. 8 illustrates a MUSHRA panel in virtual reality.
Figure 9:
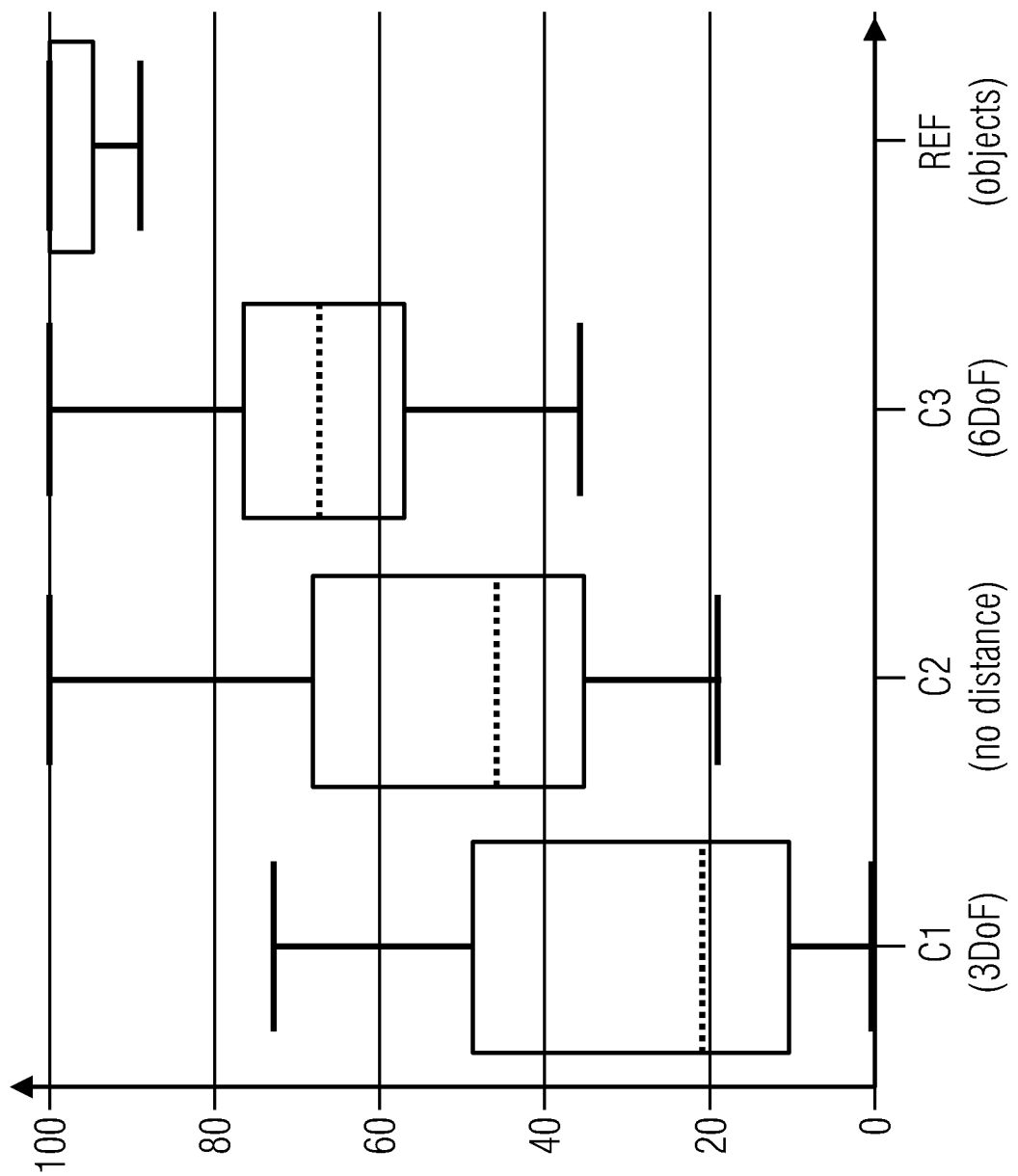
FIG. 9 illustrates MUSHRA ratings as box plots.

The MUSHRA panel in VR is depicted in FIG. 8. The sliders in FIG. 8 for rating the four conditions can be colored, below them are the numerical value and a button each to select the condition. The panel was designed in such a way that ratings of systems-under-test can be done at any time while having an unobtrusive interface in the virtual environment. By pressing a button on the hand-held controller, a semi-transparent interface is instantiated at eye level in the user's field of view (FoV), at a distance suitable for natural viewing. A laser pointer is present that replicates mouse-over states (inactive, active, pressed, highlighted) for buttons to assist with interaction. Pressing the same button on the hand-held controller removes the panel but maintains all current ratings and condition selection playback. All ratings are logged in real-time to a file including a legend for the randomization of conditions.

A total of four different conditions were implemented for the experiment.

REF Object-based rendering. This is the reference condition. The B-format is generated on the fly for the listener's current position and then rendered via the virtual speakers.

C1 3DoF reproduction. The listener position is ignored, i.e. l(n)=0, but his head rotation o(n) is still applied. The gain is set to that of sources in a distance of 2 m from the listener. This condition is used as an anchor.

C2 The proposed method for 6DoF reproduction without distance information. The listener position is used to change the direction vector. All sources are located on a sphere outside of the walking area. The radius of the sphere was fixed to 2 m, i.e., m(r)=2∀, and the distance-dependent gain is applied (γ=1).

C3 The proposed method of 6DoF reproduction with distance information. The listener position l(n) is used to change the direction vector. The distance information m(r) is used to compute the correct DoA at the listener position (5), and the distance-dependent gain (6) is applied (γ=1).

Figure 10:
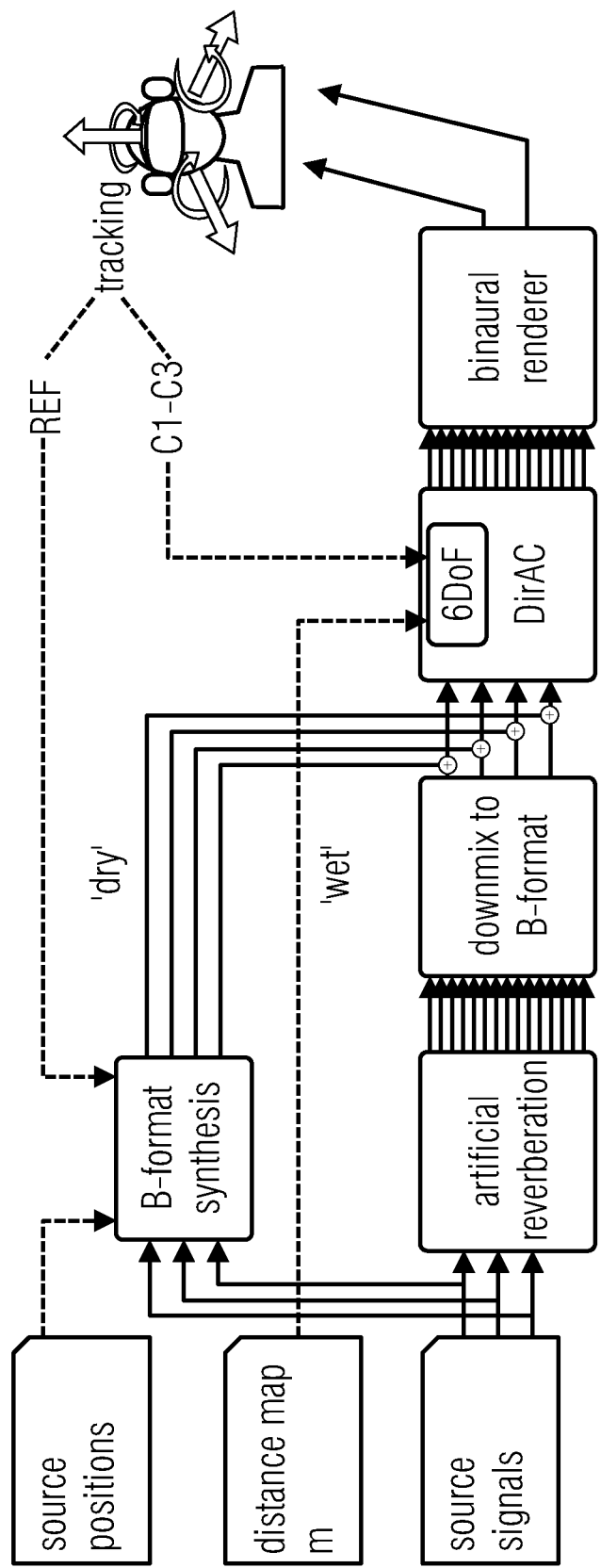
FIG. 10 illustrates the signal paths for reference rendering and DirAC.

The same signal processing pipeline is used for all conditions. This was done to ensure that the comparison is focused on the spatial reproduction only and the result is not influenced by coloration or other effects. The pipeline is shown in FIG. 10. FIG. 10 illustrates the signal paths for reference rendering and DirAC. In the reference case, the tracking data is used to change the positioning and rotation of the object-based B-format synthesis (top left). In the other conditions C1-C3, the tracking data is applied in the DirAC domain (right).

Two B-Format signals are computed from the three mono source signals. A direct (dry) signal is computed online. A reverberation (wet) signal is precomputed off-line. These are added together and processed by DirAC which renders to virtual loudspeakers, which are then binauralized. The difference lies in the application of the tracking data. In the reference case, it is applied before the synthesis of the B-format signal, such that it is virtually recorded at the listener position. In the other cases, it is applied in the DirAC domain.

Object-based rendering is used as a reference scenario. Virtually, the listener is equipped with a B-format microphone on her/his head and produces a recording at his/her head position and rotation. This is implemented straightforwardly: The objects are placed relative to the tracked listener position. An FOA signal is generated from each source with distance attenuation. The synthetic direct B-Format signal $s_i$ for a source signal $s_i(t)$ at distance $d_i$, direction with azimuth θ and elevation ψ is:

$$s_i(t) = 1 \Big/ d_i \begin{pmatrix} 1 \\ \cos\theta\cos\phi \\ \sin\theta\cos\psi \\ \sin\phi \end{pmatrix} s_i\left(t - \frac{d_i}{c}\right) \quad (12)$$

where c is the speed of sound in m/s. Thereafter, the tracked rotation is applied in the FOA domain [7].

Artificial reverberation is added to the source signal in a time-invariant manner to enhance the realism of the rendered in-door sound scene. Early reflections from the boundaries of the shoebox-shaped room are added with accurate delay, direction and attenuation. Late reverberation is generated with a spatial feedback delay network (FDN) which distributes the multichannel output to the virtual loudspeaker setup [23]. The frequency-dependent reverberation time $T_{60}$ was between 90 to 150 ms with a mean of 110 ms. A tonal correction filter with a lowpass characteristic was applied subsequently.

The reverberated signal is then converted from 8+4 virtual speaker setup to B-format by multiplying each of the virtual speaker signals with the B-format pattern of their DoA as in (12). The reverberant B-format signal is added to the direct signal.

The summed B-format is processed in the DirAC domain. The encoding is done using a quadrature mirror filter (QMF) filterbank with 128 bands, chosen for to its high temporal resolution and low temporal aliasing. Both direction and diffuseness are estimated with a moving average smoothing of 42 ms. The decoding is generating 8+4 virtual loudspeaker signals. These 8+4 signals are then convolved with HRTFs for binaural playback.

A total of 19 subjects rated the scene. They were 23-41 years old, three of them female, all reported no hearing impairments. Most participants needed less than ten minutes for the rating. Subjects that took longer where very unfamiliar with assessing virtual reality audio, where sound and vision do not always coincide.

FIG. 6 shows the resulting scores as box plots, i.e., the MUSHRA ratings (N=19) as box plots. the dotted line represents the median score, the boxes the first to third quartile, the whiskers are at +/−1.5 inter-quartile range (IQR).

It can be seen that all subjects correctly identified the reference as best, although 4 of them rated it below 100. While it sounded identical in the recording position, the differences to the other conditions was clear to all participants. The proposed 6DoF reproduction in the DirAC domain with distance information (C3) got the second highest overall score. Reproduction without distance information (C2) or even no position tracking (C1) was scored lower by almost every participant. It can be seen that the participants did not agree on the value assigned to the anchor (C1) condition. While 13 scored it below 30, the other six were not so sure and chose values up 70.

Significant main effect of condition was found ($p<0.001$, $F=43.75$) according to a one-way repeated-measures analysis of variance (ANOVA). As post hoc analysis, a Tukey multiple comparisons of means with 95% family-wise confidence level was performed. All pairs of conditions were found significantly different, most strongly so ($p<0.001$), only C2-C3 was not as clear ($p<0.04$).

Even though the conditions were found to be significantly different, the variance in the responses was relatively large. One reason for this could be the different experience levels of the test subjects with VR. It may be advisable to have a familiarization pre-test or to group the subjects by experience. However, having used a range of novice to expert in VR and listening tests while still producing significant effects shows that the results hold across these factors.

Some participants had difficulty spotting the 3DoF condition as anchor. This might as well reflect inexperience in VR audio. However, it may simplify the procedure and help with consistency to provide an additional, non-spatial anchor, such as a mono mix of the sound sources.

Regarding the proposed reproduction method, one sees that it allows for reproduction of FOA content, recorded at a single point in space, in 6DoF. While most test participants rated the ideal B-Format signal reference higher, the proposed method achieved the highest mean score for reproduction among the other conditions. The proposed method works even when the sound sources in the recording are located at different distances from the microphones. In that case, the distances have to be recorded as meta-data to be reproduced. The results show that the distance reproduction enhances the realism of the experience. The effect may be stronger if the walking area allows for the users to walk around all the sound sources.

A novel method of audio reproduction in six-degrees-of-freedom (6DoF) was proposed. The audio is recorded as first-order Ambisonics (FOA) at a single position and distance data for the sound sources is acquired as side information. Using this information, the audio is reproduced with respect to the live tracking of the listener in the parametric directional audio coding (DirAC) domain.

A subjective test showed that the proposed method is ranked closely to object-based rendering. This implies that the proposed reproduction method can successfully provide a virtual playback beyond three degrees of freedom when the distant information is taken into account.

Figure 11A:
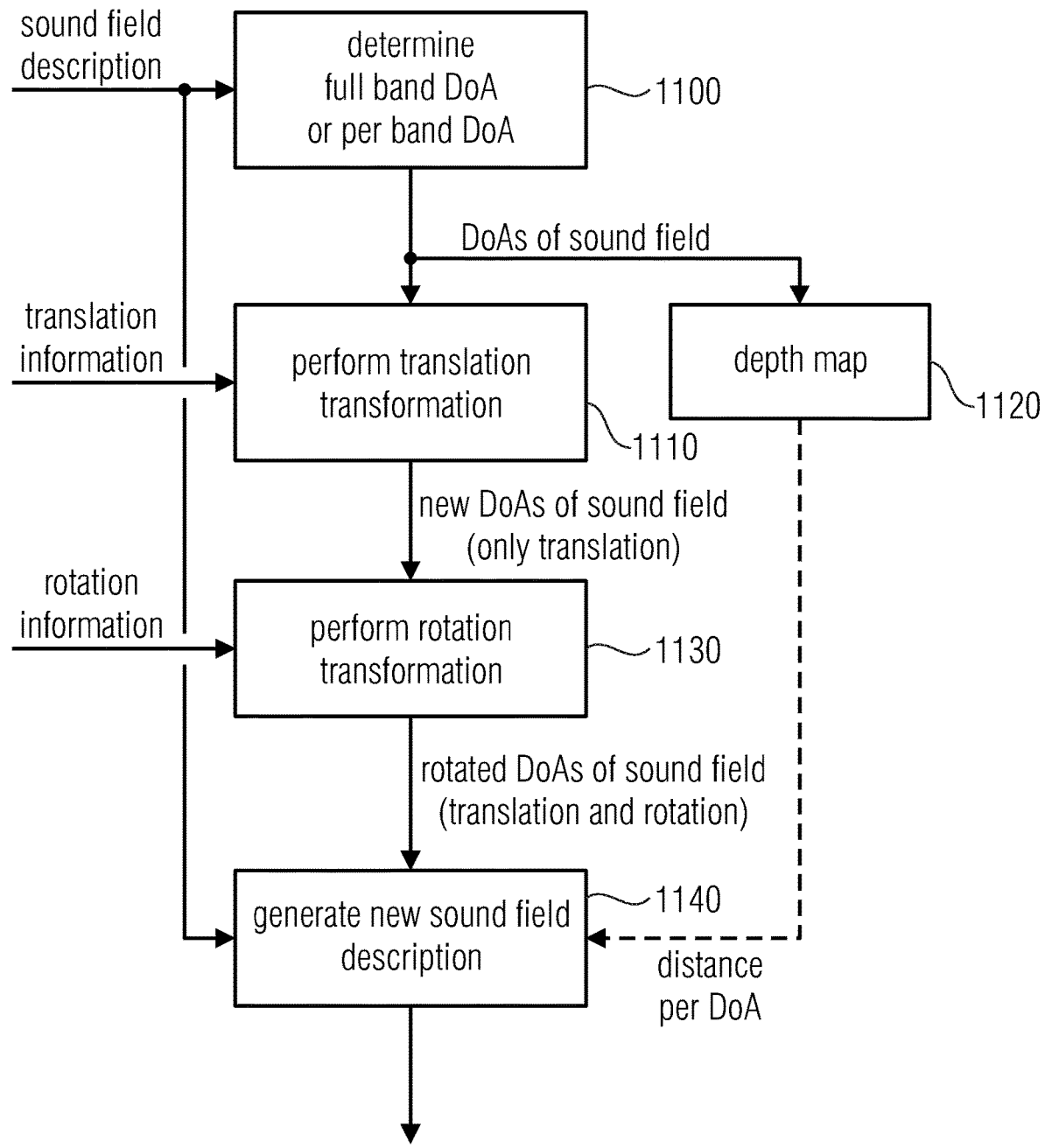
FIG. 11a illustrates an advantageous implementation of the apparatus for generating a modified sound field description.

FIG. 11a illustrates a further advantageous implementation of the sound field calculator 420.

Based on the sound field description, a full band direction of arrival or a per band direction of arrival is determined in 1100. These direction of arrival information represent the direction of arrival data of the sound field. Based on this direction of arrival data, a translation transformation is performed in block 1110. To this end, the depth map 1120 included as the meta data for the sound field description is used. Based on the depth map 1120, block 1110 generates the new direction of arrival data for the sound field that, in this implementation, only depends on the translation from the reference location to the different reference location. To this end, block 1110 receives the translation information generated, for example, by a tracking in the context of a virtual reality implementation.

Advantageously or alternatively, a rotation data is used as well. To this end, block 1130 performs a rotation transformation using the rotation information. When both the translation and the rotation is performed, then it is advantageous to perform the rotation transformation subsequent to the calculation of the new DoAs of the sound field that already include the information from the translation and the depth map 1120.

Then, in block 1140, the new sound field description is generated. To this end, the original sound field description can be used or, alternatively, source signals that have been separated from the sound field description by a source separation algorithm can be used or any other applications can be used. Basically, the new sound field description can be, for example, a directional sound field description as obtained by the Ambisonics generator 430 or as generated by a DirAC synthesizer 425 or can be a binaural representation generated from a virtual speaker representation in the subsequent binaural rendering.

Advantageously, as illustrated in FIG. 11a, the distance per direction of arrival is also used in generating the new sound field description in order to adapt the volume or loudness of a certain sound source to the new location, i.e., the new or different reference location.

Although FIG. 11a illustrates a situation, where the rotation transformation is performed subsequent to the translation transformation, it is to be noted that the order can be different. Particularly, the rotation transformation can be applied to the DoAs of the sound field as generated by block 1100 and, then, the additional translation transformation is applied that is due to the translation of a subject from the reference location to the different reference location.

However, it is to be noted that the DoAs of the sound field have to be used to find the corresponding distance information from the depth map 1120 rather than the rotated DoAs. Thus, as soon as the DoAs of the sound field have been determined by block 1100, the distance information is acquired by using the depth map 1120 and this distance information is then used by generating the new sound field description in block 1140 for accounting for a changed distance and, therefore, a changed loudness of the certain source with respect to a certain reference location. Basically, it can be said that in case the distance becomes larger, then the specific sound source signal is attenuated while, when the distance becomes shorter, then the sound source signal is amplified. Naturally, the attenuation or amplification of the certain sound source depending on the distance is made in proportion to the distance change, but, in other embodiments, less complex operations can be applied to this amplification or attenuation of sound source signals in quite coarse increments. Even such a less complex implementation provides superior results compared to a situation where any distance change is fully neglected.

Figure 11B:
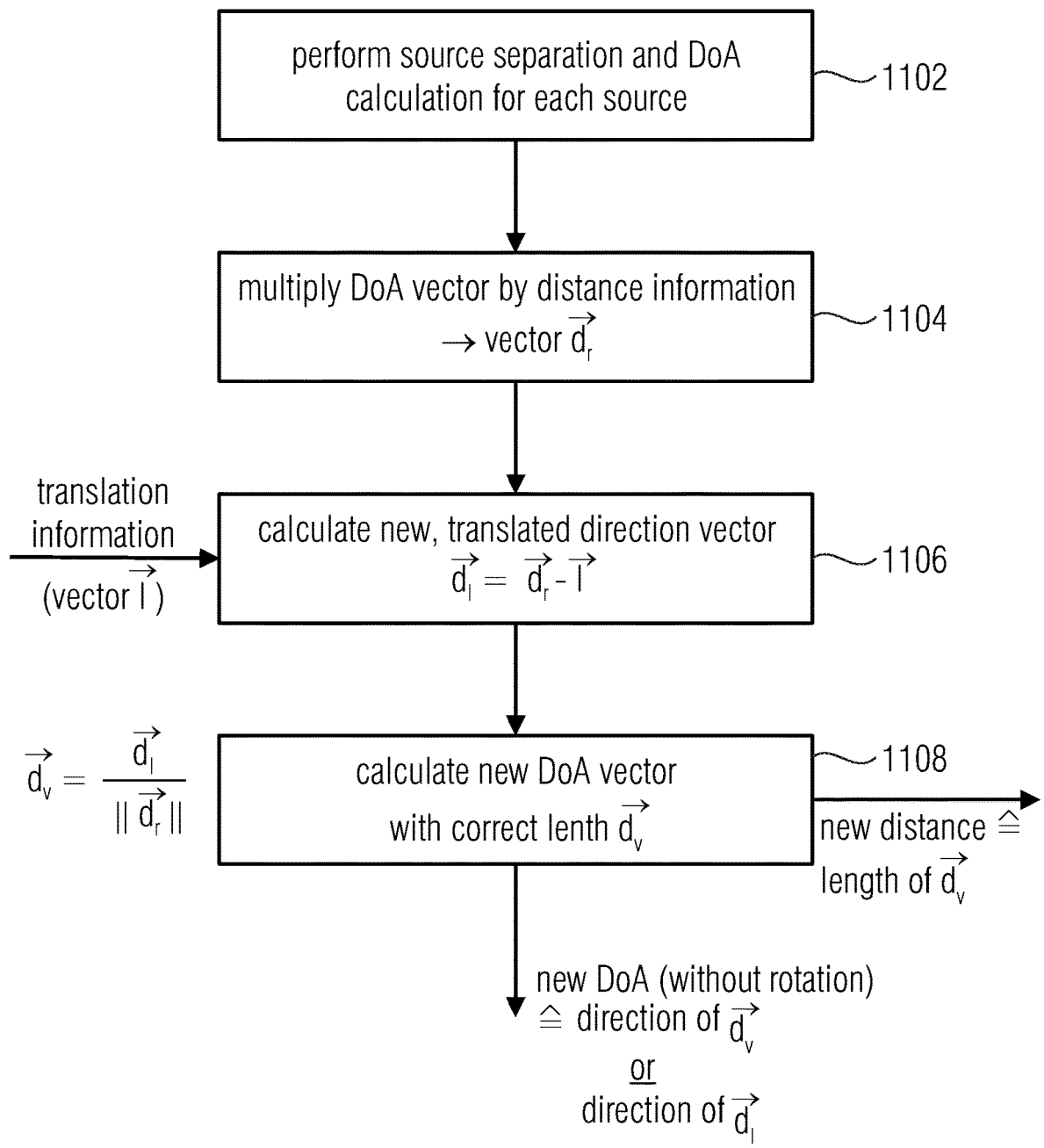
FIG. 11b illustrates an advantageous implementation for calculating a new DoA and a new distance of a sound source with respect to a new/different reference location.

FIG. 11b illustrates an advantageous implementation of the sound field calculator 420. In block 1102, a source separation and a direction of arrival or generally direction information calculation for each source is performed. Then, in block 1104, the direction of arrival vector is multiplied by the distance information vector, i.e., the vector from the original reference location to the sound source, i.e., the vector from item 520 to item 510 of FIG. 5, for example. Then, in block 1106, the translation information, i.e., the vector from item 520 to item 500 of FIG. 5 is taken into account in order to calculate the new translated direction vector that is the vector from the listener position 500 to the sound source position 510. Then, the new direction of arrival vector with the correct length indicated by $d_v$ is calculated in block 1108. This vector is directed in the same direction as $d_r$, but has a different length, since the length of this vector reflects the fact that the sound source 510 is recorded in the original sound field with a certain volume and, therefore, the length of $d_v$ more or less indicates the loudness change. This is obtained by dividing vector $d_l$ by the recording distance $d_r$, i.e., the length of vector $d_r$ from the microphone 520 to the sound source 510.

When, as in FIG. 5, the reproduced distance is greater than the recorded distance, then the length of $d_v$ will be lower than unity. This will result an attenuation of the sound source 510 for the reproduction at the new listener position. When, however, the reproduced distance $d_l$ is smaller than the recorded distance, then the length of $d_v$ as calculated by block 1108 will be greater than 1 and a corresponding scaling factor will result in an amplification of the sound source.

Figure 12:
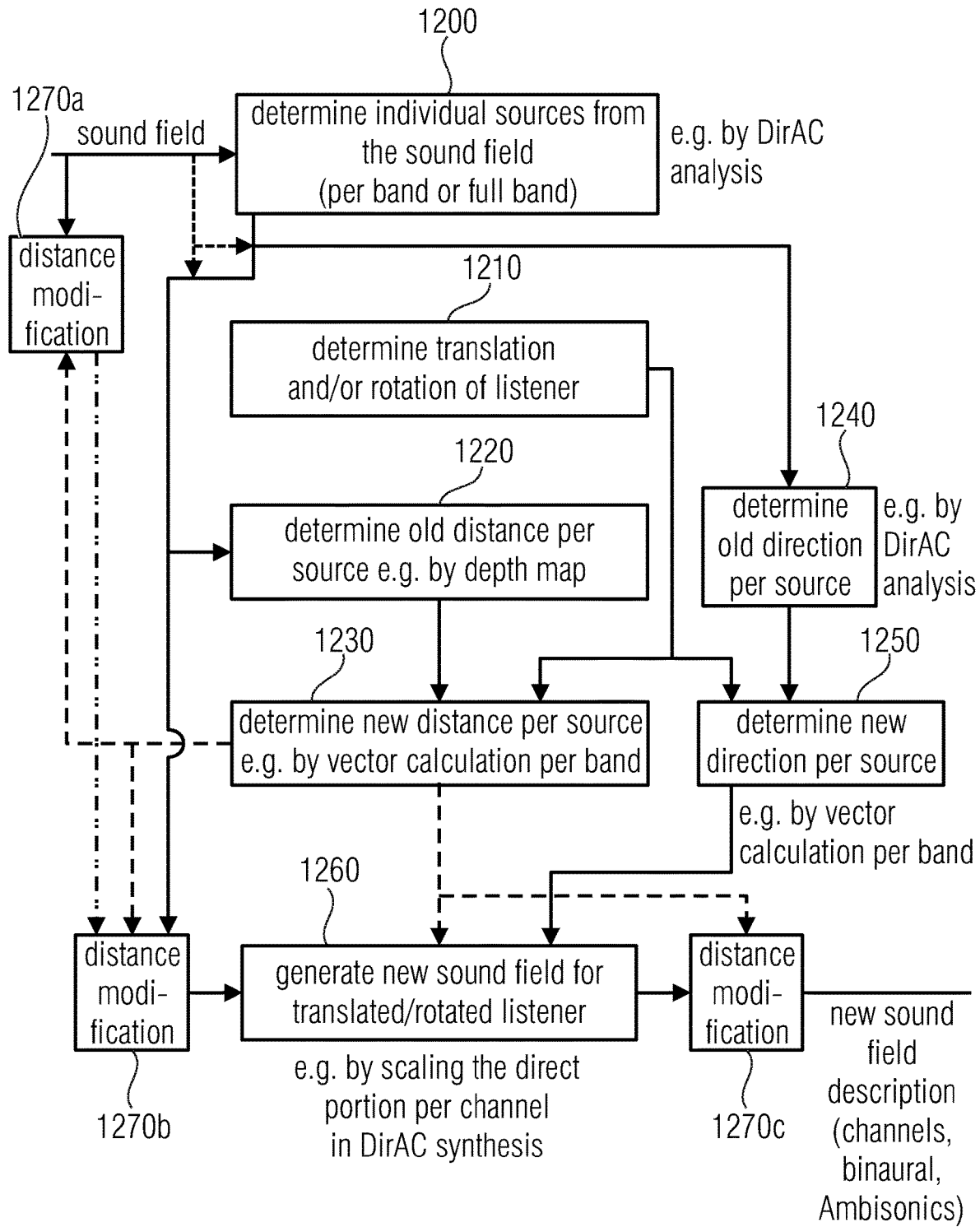
FIG. 12 illustrates a further advantageous implementation of an apparatus for generating a modified sound field description.

FIG. 12 illustrates a further advantageous implementation of the sound field calculator.

In block 1200, the individual sources from the sound field are determined, for example, per band or full band like. When a determination per frame and band is performed, then this can be done by a DirAC analysis. If a full band or subband determination is performed, then this can be done by any kind of a full band or subband source separation algorithm.

In block 1210, a translation and/or a rotation of a listener is determined, for example, by head tracking.

In block 1220, an old distance for each source is determined by using the meta data and, for example, by using the depth map in the implementation of a DirAC analysis. Thus, each band is considered to be a certain source (provided that the diffuseness is lower than a certain threshold), and then, a certain distance for each time/frequency bin having a low diffuseness value is determined.

Then, in block 1230, a new distance per source is obtained, for example, by a vector calculation per band that is, for example, discussed in the context of FIG. 11b.

Furthermore, as illustrated in block 1240, an old direction per source is determined, for example, by a DoA calculation obtained in a DirAC analysis or by a direction of arrival or direction information analysis in a source separation algorithm, for example.

Then, in block 1250, a new direction per source is determined, for example by performing a vector calculation per band or full band.

Then, in block 1260, a new sound field is generated for the translated and rotated listener. This can be done, for example, by scaling the direct portion per channel in the DirAC synthesis. Depending on the specific implementation, the distance modification can be done in blocks 1270a, 1270b or 1270c in addition or alternatively to performing the distance modification in block 1260.

When, for example, it is determined that the sound field only has a single source, then the distance modification can already be performed in block 1270a.

Alternatively, when individual source signals are calculated by block 1200, then the distance modification can be performed for the individual sources in block 1270b, before the actual new sound field is generated in block 1260.

Additionally, when the sound field generation in block 1260, for example, does not render a loudspeaker setup signal or a binaural signal, but another sound field description, for example, using a Ambisonics encoder or calculator 430, then the distance modification can also be performed subsequent to the generation in block 1260, which means in block 1270c. Depending on the implementation, a distance modification can also be distributed to several modifiers so that, in the end, a certain sound source is in a certain loudness that is directed by the difference between the original distance between the sound source and the reference location and the new distance between the sound source and the different reference location.

FIG. 13a illustrates a DirAC analyzer as originally disclosed, for example, in the earlier cited reference "Directional Audio Coding" from IWPASH of 2009.

The DirAC analyzer comprises a bank of band filters 1310, an energy analyzer 1320, an intensity analyzer 1330, a temporal averaging block 1340 and a diffuseness calculator 1350 and the direction calculator 1360.

In DirAC, both analysis and synthesis are performed in the frequency domain. There are several methods for dividing the sound into frequency bands, within distinct properties each. The most commonly used frequency transforms include short time Fourier transform (STFT), and Quadrature mirror filter bank (QMF). In addition to these, there is a full liberty to design a filter bank with arbitrary filters that are optimized to any specific purposes. The target of directional analysis is to estimate at each frequency band the direction of arrival of sound, together with an estimate if the sound is arriving from one or multiple directions at the same time. In principle, this can be performed with a number of techniques, however, the energetic analysis of sound field has been found to be suitable, which is illustrated in FIG. 13a. The energetic analysis can be performed, when the pressure signal and velocity signals in one, two or three dimensions are captured from a single position. In first-order B-format signals, the omnidirectional signal is called W-signal, which has been scaled down by the square root of two. The sound pressure can be estimated as $S=\sqrt{2}*W$, expressed in the STFT domain.

The X-, Y- and Z channels have the directional pattern of a dipole directed along the Cartesian axis, which form together a vector U=[X, Y, Z]. The vector estimates the sound field velocity vector, and is also expressed in STFT domain. The energy E of the sound field is computed. The capturing of B-format signals can be obtained with either coincident positioning of directional microphones, or with a closely-spaced set of omnidirectional microphones. In some applications, the microphone signals may be formed in a computational domain, i.e., simulated.

The direction of sound is defined to be the opposite direction of the intensity vector I. The direction is denoted as corresponding angular azimuth and elevation values in the transmitted meta data. The diffuseness of sound field is also computed using an expectation operator of the intensity vector and the energy. The outcome of this equation is a real-valued number between zero and one, characterizing if the sound energy is arriving from a single direction (diffuseness is zero), or from all directions (diffuseness is one). This procedure is appropriate in the case when the full 3D or less dimensional velocity information is available.

Figure 13B:
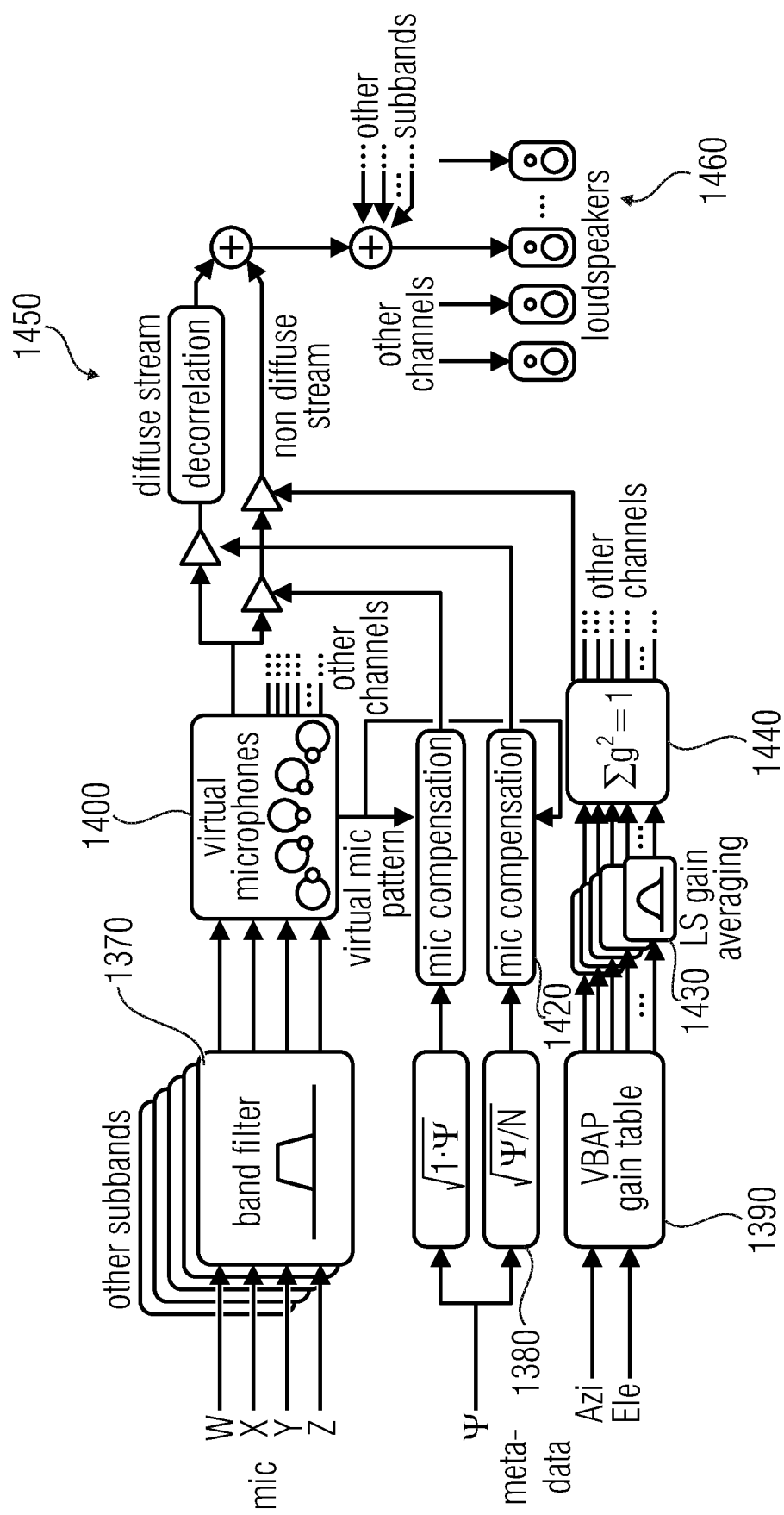
FIG. 13b illustrates a conventional DirAC synthesis implementation.

FIG. 13b illustrates a DirAC synthesis, once again having a bank of band filters 1370, a virtual microphone block 1400, a direct/diffuse synthesizer block 1450, and a certain loudspeaker setup or a virtual intended loudspeaker setup 1460. Additionally, a diffuseness-gain transformer 1380, a vector based amplitude panning (VBAP) gain table block 1390, a microphone compensation block 1420, a loudspeaker gain averaging block 1430 and a distributer 1440 for other channels is used.

In this DirAC synthesis with loudspeakers, the high quality version of DirAC synthesis shown in FIG. 13b receives all B-format signals, for which a virtual microphone signal is computed for each loudspeaker direction of the loudspeaker setup 1460. The utilized directional pattern is typically a dipole. The virtual microphone signals are then modified in non-linear fashion, depending on the meta data. The low bitrate version of DirAC is not shown in FIG. 13*b*, however, in this situation, only one channel of audio is transmitted as illustrated in FIG. 6. The difference in processing is that all virtual microphone signals would be replaced by the single channel of audio received. The virtual microphone signals are divided into two streams: the diffuse and the non-diffuse streams, which are processed separately.

The non-diffuse sound is reproduced as point sources by using vector base amplitude panning (VBAP). In panning, a monophonic sound signal is applied to a subset of loudspeakers after multiplication with loudspeaker-specific gain factors. The gain factors are computed using the information of a loudspeaker setup, and specified panning direction. In the low-bit-rate version, the input signal is simply panned to the directions implied by the meta data. In the high-quality version, each virtual microphone signal is multiplied with the corresponding gain factor, which produces the same effect with panning, however it is less prone to any non-linear artifacts.

In many cases, the directional meta data is subject to abrupt temporal changes. To avoid artifacts, the gain factors for loudspeakers computed with VBAP are smoothed by temporal integration with frequency-dependent time constants equaling to about 50 cycle periods at each band. This effectively removes the artifacts, however, the changes in direction are not perceived to be slower than without averaging in most of the cases.

The aim of the synthesis of the diffuse sound is to create perception of sound that surrounds the listener. In the low-bit-rate version, the diffuse stream is reproduced by decorrelating the input signal and reproducing it from every loudspeaker. In the high-quality version, the virtual microphone signals of diffuse stream are already incoherent in some degree, and they need to be decorrelated only mildly. This approach provides better spatial quality for surround reverberation and ambient sound than the low bit-rate version.

For the DirAC synthesis with headphones, DirAC is formulated with a certain amount of virtual loudspeakers around the listener for the non-diffuse stream and a certain number of loudspeakers for the diffuse steam. The virtual loudspeakers are implemented as convolution of input signals with a measured head-related transfer functions (HRTFs).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive enhanced sound field description can be stored on a digital storage medium or a non-transitory storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] Liitola, T., *Headphone sound externalization*, Ph.D. thesis, Helsinki University of Technology. Department of Electrical and Communications Engineering Laboratory of Acoustics and Audio Signal Processing, 2006.

[2] Blauert, J., *Spatial Hearing—Revised Edition: The Psychophysics of Human Sound Localization*, The MIT Press, 1996, ISBN 0262024136.

[3] Zhang, W., Samarasinghe, P. N., Chen, H., and Abhayapala, T. D., "Surround by Sound: A Review of Spatial Audio Recording and Reproduction," *Applied Sciences*, 7(5), p. 532, 2017.

[4] Bates, E. and Boland, F., "Spatial Music, Virtual Reality, and 360 Media," in *Audio Eng. Soc. Int. Conf. on Audio for Virtual and Augmented Reality*, Los Angeles, Calif., U.S.A., 2016.

[5] Anderson, R., Gallup, D., Barron, J. T., Kontkanen, J., Snavely, N., Esteban, C. H., Agarwal, S., and Seitz, S. M., "Jump: Virtual Reality Video," *ACM Transactions on Graphics*, 35(6), p. 198, 2016.

[6] Merimaa, J., *Analysis, Synthesis, and Perception of Spatial Sound: Binaural Localization Modeling and Multichannel Loudspeaker Reproduction*, Ph.D. thesis, Helsinki University of Technology, 2006.

[7] Kronlachner, M. and Zotter, F., "Spatial Transformations for the Enhancement of Ambisonics Recordings," in *2nd International Conference on Spatial Audio*, Erlangen, Germany, 2014.

[8] Tsingos, N., Gallo, E., and Drettakis, G., "Perceptual Audio Rendering of Complex Virtual Environments," *ACM Transactions on Graphics*, 23(3), pp. 249-258, 2004.

[9] Taylor, M., Chandak, A., Mo, Q., Lauterbach, C., Schissler, C., and Manocha, D., "Guided multi-view ray tracing for fast auralization," *IEEE Trans. Visualization & Comp. Graphics*, 18, pp. 1797-1810, 2012.

[10] Rungta, A., Schissler, C., Rewkowski, N., Mehra, R., and Manocha, D., "Diffraction Kernels for Interactive Sound Propagation in Dynamic Environments," *IEEE Trans. Visualization & Comp. Graphics*, 24(4), pp. 1613-1622, 2018.

[11] Thiergart, O., Kowalczyk, K., and Habets, E. A. P., "An Acoustical Zoom based on Informed Spatial Filtering," in *Int. Workshop on Acoustic Signal Enhancement*, pp. 109-113, 2014.

[12] Khaddour, H., Schimmel, J., and Rund, F., "A Novel Combined System of Direction Estimation and Sound Zooming of Multiple Speakers," *Radioengineering*, 24(2), 2015.

[13] Ziegler, M., Keinert, J., Holzer, N., Wolf, T., Jaschke, T., op het Veld, R., Zakeri, F. S., and Foessel, S., "Immersive Virtual Reality for Live-Action Video using Camera Arrays," in *IBC*, Amsterdam, Netherlands, 2017.

[14] Thiergart, O., Galdo, G. D., Taseska, M., and Habets, E. A. P., "Geometry-Based Spatial Sound Acquisition using Distributed Microphone Arrays," *IEEE Trans. Audio, Speech, Language Process*, 21(12), pp. 2583-2594, 2013.

[15] Kowalczyk, K., Thiergart, O., Taseska, M., Del Galdo, G., Pulkki, V., and Habets, E. A. P., "Parametric Spatial Sound Processing: A Flexible and Efficient Solution to Sound Scene Acquisition, Modification, and Reproduction," *IEEE Signal Process. Mag.*, 32(2), pp. 31-42, 2015.

[16] Pulkki, V., "Spatial Sound Reproduction with Directional Audio Coding," *J. Audio Eng. Soc.*, 55(6), pp. 503-516, 2007.

[17] International Telecommunication Union, "ITU-R BS.1534-3, Method for the subjective assessment of intermediate quality level of audio systems," 2015.

[18] Thiergart, O., Del Galdo, G., Kuech, F., and Prus, M., "Three-Dimensional Sound Field Analysis with Directional Audio Coding Based on Signal Adaptive Parameter Estimators," in *Audio Eng. Soc. Conv. Spatial Audio: Sense the Sound of Space*, 2010.

[19] Kuttruff, H., *Room Acoustics*, Taylor & Francis, 4 edition, 2000.

[20] Borβ, C., "A polygon-based panning method for 3D loudspeaker setups," in *Audio Eng. Soc. Conv.*, pp. 343-352, Los Angeles, Calif., USA, 2014.

[21] Rummukainen, O., Schlecht, S., Plinge, A., and Habets, E. A. P., "Evaluating Binaural Reproduction Systems from Behavioral Patterns in a Virtual Reality—A Case Study with Impaired Binaural Cues and Tracking Latency," in *Audio Eng. Soc. Conv.* 143, New York, N.Y., USA, 2017.

[22] Engelke, U., Darcy, D. P., Mulliken, G. H., Bosse, S., Martini, M. G., Arndt, S., Antons, J.-N., Chan, K. Y., Ramzan, N., and Brunnstrom, K., "Psychophysiology-Based QoE Assessment: A Survey," *IEEE Selected Topics in Signal Processing*, 11(1), pp. 6-21, 2017.

[23] Schlecht, S. J. and Habets, E. A. P., "Sign-Agnostic Matrix Design for Spatial Artificial Reverberation with Feedback Delay Networks," in *Proc. Audio Eng. Soc. Conf.*, pp. 1-10—accepted, Tokyo, Japan, 2018

[31] M. A. Gerzon, "Periphony: With height sound reproduction," *J. Acoust. Soc. Am.*, vol. 21,110. 1, pp. 2-10, 1973.

[32] V. Pulkki, "Directional audio coding in spatial sound reproduction and stereo upmixing," in *Proc. of the 28th AES International Conference*, 2006.

[33]--, "Spatial sound reproduction with directional audio coding," *Journal Audio Eng. Soc*, vol. 55, no. 6, pp. 503-516, June 2007.

[34] C. G. and G. M., "Coincident microphone simulation covering three dimensional space and yielding various directional outputs," U.S. Pat. No. 4,042,779, 1977.

[35] C. Faller and F. Baumgarte, "Binaural cue coding—part ii: Schemes and applications, "*IEEE Trans. Speech Audio Process*" vol. 11, no. 6, November 2003.

[36] C. Faller, "Parametric multichannel audio coding: Synthesis of coherence cues," *IEEE Trans. Speech Audio Process.*, vol. 14, no. 1, January 2006.

[37] H. P. J. E. E. Schuijers, J. Breebaart, "Low complexity parametric stereo coding," in *Proc. of the 116th A ES Convention*, Berlin, Germany, 2004.

[38] V. Pulkki, "Virtual sound source positioning using vector base amplitude panning," *J. Acoust. Soc. Am*, vol. 45, no. 6, pp. 456-466, June 1997.

[39] J. G. Tylka and E. Y. Choueiri, "Comparison of techniques for binaural navigation of higher-order ambisonics sound fields," in *Proc. of the AES International Conference on Audio for Virtual and Augmented Reality*, New York, September 2016.

The invention claimed is:

1. An apparatus for generating an enhanced sound field description, comprising:
   a sound field generator for generating at least one sound field description indicating a sound field with respect to at least one reference location; and
   a meta data generator for generating meta data relating to spatial information of the sound field,
   wherein the at least one sound field description and the meta data constitute the enhanced sound field description,
   wherein the sound field generator is configured to generate a DirAC description of the sound field, the DirAC description comprising one or more downmix signals and individual direction data for different time-frequency bins, and wherein the meta data generator is configured to generate additional individual position or depth information for the different time-frequency bins as the meta data.

2. The apparatus of claim 1,
wherein the sound field generator is configured to generate the DirAC description of a sound field so that the Dirac description additionally diffuses data for the different time-frequency bins.

3. The apparatus of claim 1,
wherein the sound field generator is configured to estimate the depth information from audio signals used by the sound field generator or from video signals associated with the audio signals or from a depth map used in stereoscopic (three dimensional) imaging/video or light field technology or from geometric information of a computer graphics scene.

4. The apparatus of claim 1,
wherein the meta data generator is configured to generate, as the additional individual position or depth information, a depth map comprising, for the individual direction data for the different time-frequency bins, corresponding distance information for the different time-frequency bins.

5. The apparatus of claim 1, further comprising an output interface for generating an output signal for transmission or storage, the output signal comprising, for a time frame, one or more audio signals derived from the sound field and the additional individual position or depth information for the different time-frequency bins.

6. The apparatus of claim 1,
wherein the sound field generator is configured to derive the individual direction data for the different time-frequency bins from the sound field, the direction data for the different time-frequency bins referring to a direction of arrival of sound for a time-frequency bin of the different time-frequency bins, and wherein the meta data generator is configured to derive the additional individual position or depth information for the different time-frequency as data items associating distance information to the individual direction data for the different time-frequency bins.

7. The apparatus of claim 6,
wherein the sound field generator is configured to derive the individual direction data for the different frequency bins per time frame of the sound field description,
wherein the meta data generator is configured to derive the data items associating the distance information to the individual direction data for the different time-frequency bins for the time frame, and
wherein an output interface is configured to generate an output signal comprising the enhanced sound field description so that the data items for the time frame are linked to the individual direction data for the different time-frequency bins.

8. The apparatus of claim 1,
wherein the additional individual position or depth information for the different time-frequency bins is a depth map comprising a plurality of direction of arrival data items as the individual direction data, and a plurality of associated distances, so that each direction of arrival data item of the plurality of direction of arrival data items has an associated distance.

9. The apparatus of claim 1,
wherein the sound field generator is configured to generate diffuseness information for a plurality of frequency bins of a time frame of the sound field, and
wherein the meta data generator is configured to only generate a distance information for a frequency bin, when a diffuseness value for the frequency bin is lower than a diffuseness threshold, or wherein the meta data generator is configured to only generate a distance meta data being different from a predetermined value, when the diffuseness value for the frequency bin is lower than a threshold diffuseness value.

10. An apparatus for generating a modified sound field description from a sound field description and meta data relating to spatial information of the sound field description, the apparatus comprising:
a sound field calculator for calculating the modified sound field description using the spatial information, the sound field description and a translation information indicating a translation from a reference location to a different reference location,
wherein the spatial information comprises depth information, and wherein the sound field description comprises a DirAC description having direction data for different time-frequency bins,
wherein the sound field calculator is configured
to calculate modified direction data for the different time-frequency bins using the direction data, the depth information and the translation information, and
to render the DirAC description using the modified direction data to a sound description comprising a plurality of audio channels or to transmit or store the DirAC description using the modified direction data for the different time-frequency bins instead of the direction data for the different time-frequency bins as comprised by the DirAC description.

11. The apparatus of claim 10,
wherein the sound field calculator is configured
to transmit or store the DirAC description additionally using the diffuseness data as comprised by the DirAC description.

12. The apparatus of claim 10, wherein the sound field calculator is configured to determine, for a time-frequency bin, to maintain the direction data or to calculate a modified direction data based on diffuseness data for the time frequency bin, wherein a modified direction data is only calculated for a diffuseness data indicating a diffuseness being lower than a predefined or adaptive diffuseness level.

13. The apparatus of claim 10, further comprising:
a translation interface for providing the translation information or rotation information indicating a rotation of an intended listener for the modified sound field description;
a meta data supplier for supplying the meta data to the sound field calculator;
a sound field supplier for supplying the sound field description to the sound field calculator; and
an output interface
for outputting the modified sound field description and modified meta data, the modified meta data being derived from the meta data using the translation information, or
for outputting a plurality of loudspeaker channels, each loudspeaker channel being related to a predefined loudspeaker position, or for outputting a binaural representation of the modified sound field description.

14. The apparatus of claim 10, wherein the sound field calculator is configured
for calculating a first vector pointing from the reference location to a sound source acquired by analysis of the sound field;
for calculating a second vector pointing from the different reference location to the sound source using the first vector and the translation information, the translation information defining a translation vector from the reference location to the different reference location; and for calculating a distance modification value using the different reference location, a location of the sound source, and the second vector, or using a distance from the different reference location to the location of the sound source and the second vector.

15. The apparatus of claim 10, wherein the direction data for the different time-frequency bins comprises a direction of arrival data, and wherein the modified direction data for the different time-frequency bins comprises a modified direction of arrival data, wherein the sound field calculator is configured to receive, in addition to the translation information, a rotation information, and wherein the sound field calculator is configured to perform a rotation transformation to rotate the modified direction of arrival data for the sound field description using the rotation information, wherein the modified direction of arrival data is derived from a direction of arrival data acquired by a sound field analysis of the sound field description and using the translation information.

16. The apparatus of claim 10, wherein the sound field calculator is configured:

to determine sources from the sound field description and directions for the sources by a sound field analysis;

to determine, for each source, a distance of the source from the reference location using the meta data;

to determine a new direction of the source related to the different reference location using the direction for the source and the translation information;

to determine a new distance information for the source related to the different reference location; and to generate a modified sound field using the new direction of the source, the new distance information, and the sound field description or source signals corresponding to the sources derived from the sound field description.

17. An apparatus for generating a modified sound field description from a sound field description and meta data relating to spatial information of the sound field description, the apparatus comprising:

a sound field calculator for calculating the modified sound field description using the spatial information, the sound field description and a translation information indicating a translation from a reference location to a different reference location, wherein the sound field description comprises a plurality of sound field components, the plurality of sound field components comprising an omnidirectional component and at least one directional component, wherein the sound field calculator comprises:
a sound field analyzer for analyzing the sound field components to derive, for different frequency bins, direction of arrival information;

a translation transformer for calculating modified direction of arrival information per frequency bin using the direction of arrival information and the meta data, the meta data comprising a depth map associating a distance information to a direction of arrival information for a frequency bin; and a distance compensator for calculating the modified sound field description using a distance compensation information depending on the distance information provided by the depth map for the frequency bin, and depending on a new distance associated with the frequency bin being related to the modified direction of arrival information.

18. An apparatus for generating a modified sound field description from a sound field description and meta data relating to spatial information of the sound field description, the apparatus comprising:

a sound field calculator for calculating the modified sound field description using the spatial information, the sound field description and a translation information indicating a translation from a reference location to a different reference location, wherein the sound field calculator is configured for calculating a first vector pointing from the reference location to a location of a sound source obtained by an analysis of the sound field description;

for calculating a second vector pointing from the different reference location to the location of the sound source using the first vector and the translation information, the translation information defining a translation vector from the reference location to the different reference location; and for calculating a distance modification value using the different reference location, the location of the sound source, and the second vector, or using a distance from the different reference location to the location of the sound source and the second vector, wherein the first vector is calculated by multiplying a direction of arrival unit vector by a distance comprised by the meta data, or wherein the second vector is calculated by subtracting the translation vector from the first vector, or wherein the distance modification value is calculated by dividing the second vector by a norm of the first vector.

19. An apparatus for generating a modified sound field description from a sound field description and meta data relating to spatial information of the sound field description, the apparatus comprising:

a sound field calculator for calculating the modified sound field description using the spatial information, the sound field description and a translation information indicating a translation from a reference location to a different reference location, wherein the spatial information comprises depth information, wherein the sound field calculator is configured:

to determine source signals from the sound field description and directions of the source signals related to the reference location by a sound analysis;

to calculate new directions of the source signals related to the different reference location using the depth information;

to calculate distance information for sound sources associated with the source signals related to the different reference location; and to obtain a synthesized modified sound field description using the distance information, the source signals and the new directions.

20. The apparatus of claim 19, wherein the sound field calculator is configured:

to obtain the synthesized modified sound field description by panning a source signal of the source signals to a direction given by the new direction in relation to a replay setup, and by scaling the source signal of the source signals using the distance information before performing the panning or subsequent to performing the panning.

21. The apparatus of claim 19,
wherein the sound field calculator is configured to add a diffuse signal to a direct part of the source signal of the source signals, the direct part being modified by the distance information before being added to the diffuse signal.

22. The apparatus of claim 19,
wherein the spatial information comprises the depth information for different time-frequency bins, the different time-frequency bins comprising different frequency bins of a time frame,
wherein the sound field calculator is configured
to perform, in the sound analysis, a time-frequency conversion of the sound field description and to calculate direction of arrival data items for the different frequency bins of the time frame, the direction of arrival data items being a DirAC description of the sound field description;
to calculate the new direction for each frequency bins of the different frequency bins of the time frame using the depth information for a corresponding frequency bin,
to calculate the distance information for each frequency bin of the different frequency bins of the time frame, and
to perform a direct synthesis for each frequency bin of the different frequency bins of the time frame using an audio signal for a corresponding frequency bin, a panning gain for the corresponding frequency bin derived from the new direction for the corresponding frequency bin, and a scaling vector for the corresponding frequency bin derived from the distance information for the corresponding frequency bin.

23. The apparatus of claim 22, wherein the sound field calculator is configured
to perform a diffuse synthesis using a diffuse audio signal derived from an audio signal for the corresponding frequency bin and using a diffuseness parameter derived by the sound analysis for the corresponding frequency bin and to combine a direct audio signal and the diffuse audio signal to obtain a synthesized audio signal for the corresponding frequency bin; and
to perform a frequency-time conversion using the synthesized audio signals for the frequency bins for a time frame to obtain a time domain synthesized audio signal as the modified sound field description.

24. The apparatus of claim 19, wherein the sound field calculator is configured to synthesize, for each sound source, a sound field related to the different reference location, the synthesis comprising:
for each source, processing a source signal using the new direction for the source signal to acquire a sound field description of the source signal related to the different reference location;
modifying the source signal before processing the source signal or modifying the sound field description using direction information; and
adding the sound field descriptions for the sources to acquire a modified sound field related to the different reference location.

25. The apparatus of claim 19,
wherein the sound analysis is configured to acquire, in addition to a source signal, a diffuse signal, and
wherein the sound field calculator is configured to add the diffuse signal to a direct part calculated using the new direction and the distance information.

26. The apparatus of claim 25,
wherein the sound analysis is configured to determine the source signals by a source separation algorithm and to subtract at least some of the source signals from the sound field description to acquire the diffuse signal.

27. A method of generating an enhanced sound field description, comprising:
generating at least one sound field description indicating a sound field with respect to at least one reference location; and
generating meta data relating to spatial information of the sound field,
wherein the at least one sound field description and the meta data constitute the enhanced sound field description,
wherein the generating the at least one sound field comprises generating a DirAC description of the sound field, the DirAC description having one or more downmix signals and individual direction data for different time-frequency bins, and wherein the generating the meta data comprises generating additional individual depth information for the different time-frequency bins as the meta data.

28. A method of generating a modified sound field description from a sound field description and meta data relating to spatial information of the sound field description, comprising:
calculating the modified sound field description using the spatial information, the sound field description and a translation information indicating a translation from a reference location to a different reference location,
wherein the spatial information comprises depth information, and wherein the sound field description comprises a DirAC description having direction data for different time-frequency bins, and
wherein the calculating comprises
calculating modified direction data for the different time-frequency bins using the direction data, the depth information and the translation information, and
rendering the DirAC description using the modified direction data to a sound description comprising a plurality of audio channels or transmitting or storing the DirAC description using the modified direction data for the different time-frequency bins instead of the direction data for the different time-frequency bins as comprised by the DirAC description.

29. A non-transitory digital storage medium having a computer program stored thereon to perform, when said computer program is run by a computer, a method of generating an enhanced sound field description, the method comprising:
generating at least one sound field description indicating a sound field with respect to at least one reference location; and
generating meta data relating to spatial information of the sound field,
wherein the at least one sound field description and the meta data constitute the enhanced sound field description,
wherein the generating the at least one sound field comprises generating a DirAC description of the sound field, the DirAC description having one or more downmix signals and individual direction data for different time-frequency bins, and wherein the generating the meta data comprises generating additional individual depth information for the different time-frequency bins as the meta data.

30. A non-transitory digital storage medium having a computer program stored thereon to perform, when said computer program is run by a computer, a method of generating a modified sound field description from a sound field description and meta data relating to spatial information of the sound field description, the method comprising:
　calculating the modified sound field description using the spatial information, the sound field description and a translation information indicating a translation from a reference location to a different reference location,
　wherein the spatial information comprises depth information, and wherein the sound field description comprises a DirAC description having direction data for different time-frequency bins, and
　wherein the calculating comprises
　　calculating modified direction data for the different time-frequency bins using the direction data, the depth information and the translation information, and
　　rendering the DirAC description using the modified direction data to a sound description comprising a plurality of audio channels or transmitting or storing the DirAC description using the modified direction data for the different time-frequency bins instead of the direction data for the different time-frequency bins as comprised by the DirAC description.

31. A method of generating a modified sound field description from a sound field description and meta data relating to spatial information of the sound field description, comprising:
　calculating the modified sound field description using the spatial information, the sound field description and a translation information indicating a translation from a reference location to a different reference location,
　wherein the sound field description comprises a plurality of sound field components, the plurality of sound field components comprising an omnidirectional component and at least one directional component,
　wherein the calculating comprises:
　　analyzing the sound field components to derive, for different frequency bins, direction of arrival information;
　　calculating modified direction of arrival information per frequency bin using the direction of arrival information and the meta data, the meta data comprising a depth map associating a distance information to a direction of arrival information for a frequency bin; and
　　calculating the modified sound field description using a distance compensation information depending on the distance information provided by the depth map for the frequency bin, and depending on a new distance associated with the frequency bin being related to the modified direction of arrival information.

32. A method of generating a modified sound field description from a sound field description and meta data relating to spatial information of the sound field description, comprising:
　calculating the modified sound field description using the spatial information, the sound field description and a translation information indicating a translation from a reference location to a different reference location,
　wherein the calculating comprises
　　calculating a first vector pointing from the reference location to a location of a sound source obtained by an analysis of the sound field description;
　　calculating a second vector pointing from the different reference location to the location of the sound source using the first vector and the translation information, the translation information defining a translation vector from the reference location to the different reference location; and
　　calculating a distance modification value using the different reference location, the location of the sound source, and the second vector, or using a distance from the different reference location to the location of the sound source and the second vector,
　wherein the first vector is calculated by multiplying a direction of arrival unit vector by a distance comprised by the meta data, or wherein the second vector is calculated by subtracting the translation vector from the first vector, or wherein the distance modification value is calculated by dividing the second vector by a norm of the first vector.

33. A method of generating a modified sound field description from a sound field description and meta data relating to spatial information of the sound field description, comprising:
　calculating the modified sound field description using the spatial information, the sound field description and a translation information indicating a translation from a reference location to a different reference location,
　wherein the calculating comprises:
　determining source signals from the sound field description and directions of the source signals related to the reference location by a sound analysis;
　calculating new directions of the source signals related to the different reference location using the depth information;
　calculating distance information for sound sources associated with the source signals related to the different reference location; and
　obtaining a synthesized modified sound field description using the distance information, the source signals and the new directions.

34. A non-transitory digital storage medium having a computer program stored thereon to perform, when said computer program is run by a computer, a method of any one of claims 31-33.

* * * * *